US012379291B2

(12) United States Patent
Makarov et al.

(10) Patent No.: US 12,379,291 B2
(45) Date of Patent: Aug. 5, 2025

(54) SYSTEMS AND METHODS FOR IMAGING AND ABLATING A SAMPLE

(71) Applicants: Thermo Fisher Scientific (Bremen) GmbH, Bremen (DE); LIFE TECHNOLOGIES CORPORATION, Eugene, OR (US); FEI DEUTSCHLAND GmbH, Dreieich (DE)

(72) Inventors: Alexander Makarov, Bremen (DE); Michael Ward, Eugene, OR (US); Rainer Daum, Wessling (DE)

(73) Assignees: Thermo Fisher (Bremen) GmbH, Bremen (DE); Life Technologies Corporation, Carlsbad, CA (US); FEI Deutschland GmbH (DE)

( * ) Notice: Subject to any disclaimer, the term of this patent is extended or adjusted under 35 U.S.C. 154(b) by 485 days.

(21) Appl. No.: 17/751,506

(22) Filed: May 23, 2022

(65) Prior Publication Data

US 2023/0011590 A1 Jan. 12, 2023

Related U.S. Application Data

(60) Provisional application No. 63/193,335, filed on May 26, 2021.

(51) Int. Cl.
*G01J 3/44* (2006.01)
*G01N 1/28* (2006.01)
(Continued)

(52) U.S. Cl.
CPC ......... *G01N 1/286* (2013.01); *G01N 21/6408* (2013.01); *G01N 21/6456* (2013.01);
(Continued)

(58) Field of Classification Search
CPC .............. G01N 1/286; G01N 21/6408; G01N 21/6456; G01N 21/65; G01N 1/04;
(Continued)

(56) References Cited

U.S. PATENT DOCUMENTS 8,227,724 B2 * 7/2012 Fukuyo ............... B23K 26/046
219/121.65
8,637,813 B2 * 1/2014 Van Berkel ......... H01J 49/0463
250/288
(Continued)

FOREIGN PATENT DOCUMENTS

EP 3458841 B1 3/2021
JP H06265773 9/1994
(Continued)

OTHER PUBLICATIONS

Niehaus et al., "Transmission-mode MALDI-2 mass spectrometry imaging of cells and tissues at subcellular resolution," *Nature methods*, 16(9): 925-931 (Sep. 2019).
(Continued)

*Primary Examiner* — Abdullahi Nur

(57) ABSTRACT

Disclosed herein are systems for imaging and ablating a sample. An imaging/ablating device includes an optical assembly, a sample stage, and a receiver. The optical assembly enables ablation of a region of interest within the sample. The laser light propagated from the optical assembly during ablation propagates substantially in the same direction as the direction of travel of the ablation plume toward the receiver. A laser focus detection unit including at least one reference laser and photodetector generates at least one real-time detection signal indicative of one or more characteristics of the sample during ablation and/or of a distance from the objective to the sample stage or a surface of the sample. A controller coupled with the laser focus detection unit dynamically controls in real-time one or more parameters of (Continued)

the ablation laser and/or a position of the objective and/or a position of the receiver relative to the sample to improve MS imaging quality.

28 Claims, 20 Drawing Sheets

(51) Int. Cl.
*G01N 21/64* (2006.01)
*G01N 21/65* (2006.01)
*G01N 30/72* (2006.01)
*G01N 30/02* (2006.01)

(52) U.S. Cl.
CPC ......... *G01N 21/65* (2013.01); *G01N 30/7233* (2013.01); *G01N 2001/2886* (2013.01); *G01N 2030/027* (2013.01); *G01N 2201/06113* (2013.01)

(58) Field of Classification Search
CPC .. G01N 21/6458; G01N 21/718; G01N 27/62; G01N 30/72; G01N 21/6486; G02B 19/00
USPC ...................................................... 250/201.2
See application file for complete search history.

(56) References Cited

U.S. PATENT DOCUMENTS

| | | |
|---|---|---|
| 10,393,587 B1 | 8/2019 | Yoo et al. |
| 10,714,326 B2 | 7/2020 | Holman et al. |
| 11,219,393 B2 | 1/2022 | Taghioskoui |
| 2019/0180996 A1* | 6/2019 | Loboda ................. H01J 49/105 |

FOREIGN PATENT DOCUMENTS

| | | |
|---|---|---|
| JP | 2002-321080 | 11/2002 |
| JP | 2012-159854 | 8/2012 |
| JP | 2017-097301 | 6/2017 |
| JP | 2021-028072 | 2/2021 |
| WO | WO 2019/246033 A1 | 12/2019 |
| WO | WO-2021104855 A1 | 6/2021 |

OTHER PUBLICATIONS

Notice of Reasons for Refusal for related JP Application No. 2022-085925, 6 pages, dated Jun. 19, 2023.
Notice of Reasons for Refusal for related JP Application No. 2022-085925, 2 pages, dated Oct. 11, 2023.
Decision to Grant a Patent for related JP Application No. 2022-085925, 6 pages, dated Dec. 27, 2023.

\* cited by examiner

SYSTEMS AND METHODS FOR IMAGING AND ABLATING A SAMPLE

BACKGROUND

Technical Field

This disclosure relates generally to systems, devices, and methods for imaging and ablating a sample. In particular, this disclosure relates to systems, devices, and methods for imaging and ablating a biological sample capable of access to sub-cellular detail and capable of transferring an ablated target, without excess degradation of the target, to a receiver to allow for additional downstream analysis.

Related Technology

The "-omics" fields seek to characterize, quantify, or otherwise analyze sets of biological molecules that relate to the structure, function, or dynamics of a target organism or group of organisms. Each -omic field relates to the study of an associated "-ome." The -omics fields include the fields of: genomics, which is the study of the genome; epigenomics, which is the study of the supporting structure of the genome, including DNA binders and chemical modifications of DNA; transcriptomics, which is the study of the set of RNA molecules generated by the target organism(s), including mRNA, miRNA, rRNA, and tRNA; proteomics, which is the study of the complement of proteins generated by the target organism(s); and metabolomics, which is the study of the collection of metabolites generated through cellular processes of the target organism(s).

"Multiomics," (also sometimes referred to as integrative omics) involves the analysis of one or more of such -omes. The goal of multiomics analysis is to gather and/or analyze complex biological data to, for example, discover associations across the various -omes in a way that can better pinpoint markers of disease, allow a better understanding of the partitioning between genotype, phenotype, and environmental effects for a particular condition, and provide greater insight into the ways the various -omes regulate and affect each other.

Several challenges remain, however, to further advancing the field of multiomics. In particular, when moving along the genotype to phenotype path from genome to transcriptome and then to proteome and metabolome, the level of chemical variety and complexity increases exponentially. With that increase in complexity comes associated increased difficulty in obtaining and analyzing the relevant biomolecules.

Further, the relevant regions of interest in which target biomolecules reside are often at the sub-cellular level. It is therefore challenging to obtain the target biomolecules in a way that allows effective downstream analysis of the biomolecules. However, conventional methods such as laser ablation electrospray ionization (LAESI), including picosecond infrared LAESI (PIR LAESI), do not allow for collection of biomolecules at the sub-cellular level. In LAESI, laser-ablated material are ionized by nanometer-sized droplets from an electrospray ion source which are then transmitted to a mass spectrometer for analysis. Conventional LAESI systems, however, have inherent spatial constraints that lead to low numerical aperture (NA) optics. The low NA optics used for ablation of the sample lead to large ablation spot sizes. Minimum spot sizes, for example, are typically much larger than whole living cells, and are simply not small enough to allow for the targeted ablation of sub-cellular regions of interest.

Direct access to intra-cellular and/or inter-cellular biological material of living cells is also key to effectively analyzing the biochemical aspects of such cells under real time conditions. However, conventional methods of obtaining targeted cellular material for further downstream analysis typically rely on fixing, and often drying, a sample. For example, matrix-assisted laser desorption/ionization time-of-flight (MALDI TOF) uses a matrix for ionization of molecular components. The requirement to fix the sample makes MALDI TOF incompatible with monitoring of live cells.

There is therefore an ongoing need for systems, devices, and methods capable of obtaining cellular material from living cells at the sub-cellular level in a manner that allows for effective downstream analysis of the obtained material.

SUMMARY

Embodiments described herein enable the collection of targeted biological material from a sample in a manner that that does not excessively degrade the biological material and allows for effective downstream analysis of the obtained material. In certain embodiments, the sample may include live cells, and the targeted biological material may be obtained under normal ambient conditions (e.g., without pressure control, humidity control, etc.). In certain embodiments, a targeted region of interest of the sample may have a sub-cellular size. In certain embodiments, the targeted biological material may be removed from a cell with minimal impact on the remaining cellular structure in a manner that may even allow the cell to survive to be optionally used for further testing. In certain embodiments, characteristics of the sample ablation are monitored in real-time during ablation and contain spatial and temporal information. This enables parameters of the ablation device to be dynamically adjusted accordingly in real-time to allow for optimization of ablation and/or maintaining constant conditions for analysis of the sample, such as mass spectrometry imaging, which can improve MS imaging quality.

In one embodiment, there is provided a device for imaging and ablating a sample that allows for analysis of an ablated portion of the sample, the device comprising a sample stage having a first side (e.g., an upper side) configured for placement of a sample thereon and a second side (e.g., a lower side) disposed opposite the first side. The device includes an optical assembly including an objective, the objective being disposed on the second side of the sample stage and being configured to enable microscopic imaging of the sample placed on the sample stage, the optical assembly also including an ablation laser. The ablation laser is disposed on the second side of the sample stage, the ablation laser being configured to direct laser light through the objective, through the sample stage and into the sample to selectively ablate at least a portion of the sample (e.g. a targeted region of interest of the sample). The sample stage typically has a transparent window to permit passage of laser and other light. The sample may be placed on the upper surface of the transparent window. The transparent window may be made of glass or plastic, for example. The transparent window may be a slide or coverslip, for example. The transparent window generally defines a field of view (FOV) for the optical assembly, e.g. objective. A receiver is disposed on the first side of the sample stage, the receiver being configured to receive ablated material ejected from the sample to enable further analysis of the ablated material.

In one embodiment, the optical assembly also includes a laser focus detection unit (FDU), which includes at least one reference laser, the at least one reference laser being disposed on the second side of the sample stage and being configured to direct laser light through the objective, through the sample stage and into the sample. The FDU can detect or observe interfaces between media having different refractive indices. In this way, the axial (z) position of one or more interfaces, e.g. atmosphere/sample stage interface, sample stage/sample interface, or sample/atmosphere interface. This enables the relative positions (distance) of, e.g. the objective lens to sample and the sample thickness, each of which can be monitored in real time. The laser focus detection unit further includes at least one photodetector, the at least one photodetector being configured to generate at least one detection signal by detecting laser light from the at least one reference laser, which is indicative of one or more characteristics of the sample while at least a portion of it is being ablated and/or indicative of a distance from the objective to the sample stage and/or indicative of a distance from the objective to a surface of the sample. In the case of the sample, one or more of the following can be observed: a cavity size in the sample (and its delay with respect to the ablation laser pulse); a height or position of the sample/atmosphere interface, e.g. relative the sample stage or objective; and axial plume formation from the sample into atmosphere.

The laser focus detection unit is further configured to send the at least one detection signal to a controller, the controller being configured to dynamically control one or more parameters of the ablation laser and/or a position of the objective and/or a position of the receiver based on the at least one detection signal. The position of the objective and/or position of the receiver is thereby adjusted relative to the position of the sample.

In one embodiment, the laser focus detection unit is configured to continuously, or with high frequency, detect laser light from the at least one reference laser using the at least one photodetector and send the at least one detection signal to the controller. In this way, the at least one detection signal can allow real-time monitoring of the sample during ablation and/or of the position of the objective and/or receiver relative to the sample. The at least one photodetector preferably has a time resolution of 100 microseconds or less than 100 microseconds. In one embodiment, the at least one reference laser can be modulated on and off to avoid conflict with the other light or excitation sources and the detection of images from the sample. At least one photodetector preferably has a nanosecond time resolution or sub-nanosecond time resolution (light from the at least one reference laser is detected with a time resolution of), e.g., of 1-10 nanoseconds or less, such as 1 nanosecond or less than 1 nanosecond. The photodetector having sub-nanosecond time resolution can be used to probe the dynamics of the ablation plume expansion in a continuous manner. For this function, the photodetector having sub-nanosecond time resolution can be on, i.e. active, all the time. However, the at least one reference laser that is detected by the photodetector having sub-nanosecond time resolution can be modulated on and off.

In one embodiment, the one or more characteristics of the sample include one or more of the following: formation of a cavity in the sample caused by the laser light from the ablation laser, formation of an ablation plume resulting from ablated material ejected from the sample, and a change in the thickness of the sample. In many instances, a thickness change of the sample disappears after a millisecond time range due to the surface tension of water present on or in the sample. In some instances of very thin samples (single layers of cells), a 'dip' may be left in the surface after ablation.

In one embodiment, the controller is configured to control one or more parameters of the ablation laser based on the at least one detection signal that include a laser pulse energy and/or a laser pulse frequency. In one embodiment, the at least one detection signal may be used to monitor if an ablation plume is being formed at the sample surface (i.e. sample-air surface). If the ablation plume is not being formed at the sample surface, the laser pulse energy and/or a laser pulse frequency may be adjusted by the controller. Preferably, the laser pulse energy may be increased and/or the laser pulse frequency may be increased until the ablation plume is formed at the surface.

In one embodiment, the controller is configured to continuously adjust, i.e. in real-time with a high digital frequency, a position of the objective and/or a position of the receiver based on the at least one detection signal. One or more actuators may drive the objective. Similarly, one or more actuators may drive the receiver stage. The actuator(s) may be controlled by the controller in real-time. The actuator(s) may have a response time in the sub-millisecond range, e.g. 1 millisecond or less than 1 millisecond response time, allowing real-time control of the positions. The position of the objective and/or position of the receiver that is adjusted may be an axial position (herein termed z position), which changes the distance between the objective and the sample stage or between the receiver stage and the sample stage. In this way, for example, the depth of focus of the laser light from the ablation laser in the sample can be continuously adjusted by adjustment of the position of the objective. This is advantageous as the thickness of the sample changes with time. Furthermore, the distance of the receiver from the sample surface can be kept constant and/or in an optimum range.

In one embodiment, the at least one photodetector includes a photodetector configured to detect laser light from the at least one reference laser that has been reflected from and/or transmitted through at least one surface or interface of the sample stage and/or sample. In one embodiment, the at least one photodetector includes a photodetector configured to detect laser light from the at least one reference laser that has been reflected from a surface or interface of the sample stage and directed back through the objective. In one embodiment, the at least one photodetector includes a photodetector configured to detect laser light from the at least one reference laser that has been reflected from a surface or interface of the sample facing the receiver and directed back through the objective. In such embodiments, the photodetector can include an array detector. The array detector can enable peak detection of the at least one reference laser. The peaks are observables of the FDU and are originated from the (axial) interfaces of the sample with different refractive indices. The array detector can include a plurality of individual photodetectors or pixels. The array detector can be combined with an FPGA and a controller to achieve fast signal analysis (e.g. peak detection in a microsecond time range).

In one embodiment, the at least one photodetector includes a photodetector that is disposed on the first side of the sample and is configured to detect laser light from the at least one reference laser that has been transmitted through the sample. Preferably, this photodetector signal is monitored simultaneously with the ablation of the sample.

In one embodiment, the at least one photodetector is configured to resolve the at least one detection signal with sub-nanosecond time resolution. This enables monitoring over time of the position of a cavity formed in the sample by laser light focused by the objective into the sample. Such cavities travel typically at the speed of sound in the sample medium.

In one embodiment, the at least one reference laser is a diode laser, preferably in the form of a photonic integrated circuit. In one embodiment, the at least one reference laser comprises a plurality of reference lasers, i.e. at least a first reference laser and a second reference laser. The plurality of reference lasers may be provided as laser output apertures of a photonic integrated circuit (PIC).

In one embodiment, the at least one reference laser comprises at least a first reference laser configured to direct first laser light to the objective along an axis offset from the optical axis of the objective and the at least one photodetector is configured to detect first laser light reflected back through the objective along an axis offset from the optical axis of the objective. The detected first laser light can provide information about a distance of the objective to the sample stage and/or a distance of the objective to the sample-air interface. A method of triangulation can be used to determine these distances. This approach further allows to monitor the interface of the sample medium/air with high time resolution. For example, with a fast photodiode, it becomes possible to monitor the timing of ablation, propagation of the cavity to the sample surface, and emitting the plume of the cavity into atmosphere.

In one embodiment, the at least one reference laser comprises at least a second reference laser configured to direct second laser light to the objective along the optical axis of the objective and the at least one photodetector is configured to detect second laser light reflected back through the objective along the optical axis of the objective. The at least one photodetector configured to detect second laser light reflected back along the optical axis of the objective may form part of an interferometer, which itself may be part of an Optical Coherence Tomography (OCT) setup. A suitable OCT technique is described by Wang et al, Optics Letters, Vol. 42, No. 17, 2017, pages 3466-3469. The second laser light reflected back along the optical axis of the objective thereby can provide an interference signal from a cavity formed in the sample by the laser light from the ablation laser, e.g. simultaneously. The interferometer or OCT setup preferably allows an interference signal to be generated by first laser light reflected from the laser-induced cavity in the sample, and/or from the ablation plume/sample interface. The interference signal can provide precise, time resolved position information about the cavity in the medium and/or plume formation in atmosphere. The information about the cavity and/or plume formation can be provided in real time and with sub-nanosecond resolution (1 ns or less). With the interferometer, the observation volume can be extended from the sample medium only into the plume volume of the ablated material leaving the sample into the atmosphere. As part of an OCT setup, the interference signal can provide tomographic measurement of the cavity and/or plume formation.

In one embodiment, the device may further comprise a light source disposed on the first side of the sample, the light source being configured for trans-illumination of the sample. A flash light or lamp may be utilised for this purpose. The flash light or lamp preferably can emit nanosecond (e.g. 1-10 ns) or sub-nanosecond (less than 1 ns) width light pulses. Thus, snap-shot imaging may be obtained with the flash light/lamp, i.e. snapshot image of the cavity at a time delay t after pulsing the sample with the ablation laser. A detector, such as camera, may be disposed on the second side of the sample to detect the trans-illuminated light and form an image of the sample. The trans-illumination light may be used for cavity size determination in the sample, e.g. at any axial position of the depth of focus of the objective lens in use.

In one embodiment, the device may further comprise a fluorescence excitation source configured for epifluorescence imaging and/or analysis of the sample. The fluorescence excitation source is preferably disposed on the second side of the sample. The fluorescence excitation may be applied with a delay after the ablation laser. The fluorescence excitation source may comprise a pulsed light source, preferably with ~ns pulse length, at matching fluorescence excitation wavelength to probe a quantity of fluorescing (marker) molecules of interest in the sample.

A detector, such as a camera, or a spectrometer with a (fast) photodetector, may be provided that is configured to spectrally resolve and/or time resolve (i.e. detect in real-time) fluorescence emission from the sample in response to auto fluorescence after application of the ablation laser (with fluorescence excitation source off) or irradiation by the fluorescence excitation source at a time delay t' after application of the ablation laser, and provide a fluorescence image or signal. The fluorescence emission detection may occur with sub-millisecond exposure times. The detector for fluorescence emission is preferably disposed on the second side of the sample. The detector, such as a camera, used to detect fluorescence emission may be the same detector or camera used to detect trans-illumination. With this system, cavity formation in the sample medium may be imaged with trans-illumination using the flash light at a time t after the ablation laser pulse(s), and fluorescence imaged after fluorescence excitation at a later time t'. Time delayed snapshot imaging information can thus also be obtained from the different light sources of trans-illumination and fluorescence. With a camera having sufficient dynamic intensity range, the image can show two kinds of contrast. Typically, the contrast area of the trans-illumination and fluorescence image are not the same. A high contrast may be seen from the trans-illumination image and a weak(er) signal can be identified as fluorescence.

The detected epifluorescence signal or image is preferably time-resolved and may be used to provide cavity characteristics and information about molecular fragmentation in the sample, i.e. at the focal position of the objective lens. A spectral image splitter can be used to guide the fluorescence light onto a fast(er) photo detector (e.g. an array) combined with a spectrometer to separate the trans-illumination image from the fluorescence image spectrally.

In one embodiment, a depletion in measured fluorescence indicates fragmentation of molecules in the sample caused by the ablation, typically because the laser pulse energy is too high. In that case the next laser pulse(s) needs to be applied with lower energy. Accordingly, the fluorescence signal may be used to adjust the laser pulse energy. Quantitative fluorescence intensity analysis can allow estimation of the transfer efficiency of material to the receiver and thereby to the analyser, such as a mass spectrometer.

In one embodiment, a Raman signal from the focus of the ablation laser may additionally or alternatively be detected. A Raman signal provides complementary information to a fluorescence signal. Whilst the Raman signal generally has lower sensitivity than fluorescence, it has the advantage that the sample does not need to be modified with a fluorophore label. Raman signals from ablated material may be detected for example by the same detector or spectrometer as used to detect fluorescence. Raman signals provide vibrational and rotational bands of the ablated molecules. The occurrence of the Raman signal reveals information on expected masses of the molecules sent to the analyser (e.g. mass spectrometer) for example, whilst the intensity distribution of the vibrational/rotational bands indicate the thermal state (internal energy) of the molecules. The Raman spectra can be correlated with the peak intensity of the molecule detected in the analyser (mass spectrometer). Thus, optimizing the Raman signal may be used for more quantitative calibration of the molecule detected in the analyser (mass spectrometer).

Various further features of the ablation device and system are now described.

In one embodiment, the ablation laser and objective are configured such that the laser light is directed through the objective and is oriented so that the laser light substantially propagates in the intended direction of movement of an ablation plume resulting from ablation of the sample. This beneficially allows the expanding ablation plume to effectively travel toward the receiver along a line substantially parallel to the direction of propagating laser light rather than against it.

The optical assembly may be configured to enable brightfield imaging, sectioning (e.g., via confocal microscopy), epifluorescence imaging, two-photon imaging, or combinations thereof. The objective may have a numerical aperture (NA) of about 0.5 or more, or about 0.65 or more, or about 0.75 or more, or about 0.8 or more.

The ablation laser is preferably a pulsed laser. The ablation laser is preferably a femtosecond, infrared laser. The laser and other optical assembly components may be configured to deliver pulse energies of about 1 nJ to about 10 μJ per $\mu m^3$ of sample. A targeted region of interest to be ablated may have a "spot size" diameter of about 50 μm or less, or about 30 μm or less, or about 10 μm or less, or about 5 μm or less, or about 3 μm or less, or about 1.5 μm or less, or about 1 μm or less. In volumetric terms, the targeted region of interest to be ablated may have a volume of about 500 $\mu m^3$ or less, about 250 $\mu m^3$ or less, about 100 $\mu m^3$ or less, about 50 $\mu m^3$ or less, about 25 $\mu m^3$ or less, about 10 $\mu m^3$ or less, about 5 $\mu m^3$ or less, or about 2 $\mu m^3$ or less. The optical assembly may therefore be utilized to ablate multiple whole cells, single whole cells, or sub-cellular volumes, such as targeted organelles or other intracellular structures, or extracellular volumes outside of cells.

In one embodiment, the receiver includes a medium configured for non-overlapping, spatial differentiation of individual subsamples of ablated material, such as a microwell plate or chip. In one embodiment, the receiver includes a nanodroplet array. In one embodiment, the receiver includes an electrospray probe configured to collect ablated subsamples and transmit them to an inlet of a mass spectrometer in the form of ionized droplets. The electrospray probe may be associated with a capillary that provides a solvent for wetting an outer surface of the electrospray probe.

In one embodiment, a system for ablating and analyzing a targeted region of a sample includes an imaging and ablating device and an analyzer configured to receive and analyze at least a portion of the ablated material received by the receiver. The analyzer may include, for example, one or more PCR machines, sequencing machines, optical spectrometers, nuclear magnetic resonance (NMR) spectrometers, mass spectrometers, chromatography devices, centrifuges, electrophoresis devices, radiolabeling and radiolabel detection devices, other analytical biochemistry devices, or combinations thereof. The system may further include an upstream processor, such as an electrical droplet sorter, sorting centrifuge, or the like, configured for sorting or otherwise processing of a sample prior to positioning of the sample on the sample stage.

In one embodiment, a method of imaging and ablating sample to enable analysis of an ablated portion of the sample includes the steps of providing an imaging and ablating device, acquiring an image of the sample, selecting a region of interest within the sample, delivering laser light to the region of interest to ablate at least a portion of the region of interest. And capturing at least a portion of the ablated material on the receiver.

In one embodiment, the method includes dynamically (e.g. in real-time with millisecond or better time resolution) adjusting one or more parameters of an ablation laser and/or a position of an objective and/or a position of a receiver based on at least one detection signal from a laser focus detection unit.

In one embodiment, the ablation is carried out in ambient atmosphere. In one embodiment, the sample includes live cells. In one embodiment, the ablated subsample is removed from a targeted cell without killing the targeted cell.

In one embodiment, multiple laser pulses are applied to the sample. Multiple laser pulses may be applied to ablate one subsample. Multiple ablated subsamples may be formed from multiple ablation events and may be collected at the receiver in non-overlapping, spatially distinguished positions. One or more of laser pulse frequency, laser pulse energy level, or laser pulse depth may be dynamically varied across the multiple laser pulses. For example, in one operational mode, laser pulse intensity is set an initial high level to remove material in the sample overlying the region of interest, and is then set to a lower level for ablation of the at least a portion of the region of interest.

This summary is provided to introduce a selection of concepts in a simplified form that are further described below in the detailed description. This summary is not intended to identify key features or essential features of the claimed subject matter, nor is it intended to be used as an indication of the scope of the claimed subject matter.

Additional features and advantages of the disclosure will be set forth in the description which follows, and in part will be obvious from the description, or may be learned by the practice of the disclosure. The features and advantages of the disclosure may be realized and obtained by means of the instruments and combinations particularly pointed out in the appended claims. These and other features of the present disclosure will become more fully apparent from the following description and appended claims or may be learned by the practice of the disclosure as set forth hereinafter.

BRIEF DESCRIPTION OF THE DRAWINGS

In order to describe the manner in which the above recited and other advantages and features of the disclosure can be obtained, a more particular description of the disclosure briefly described above will be rendered by reference to specific embodiments thereof, which are illustrated in the appended drawings. It is appreciated that these drawings depict only typical embodiments of the disclosure and are not therefore to be considered to be limiting of its scope. The disclosure will be described and explained with additional specificity and detail through the use of the accompanying drawings in which.

DETAILED DESCRIPTION

Introduction

Before describing various embodiments of the present disclosure in detail, it is to be understood that this disclosure is not limited to the parameters of the particularly exemplified systems, methods, apparatus, products, processes, and/or kits, which may, of course, vary. Thus, while certain embodiments of the present disclosure will be described in detail, with reference to specific configurations, parameters, components, elements, etc., the descriptions are illustrative and are not to be construed as limiting the scope of the claimed invention. In addition, the terminology used herein is for the purpose of describing the embodiments and is not necessarily intended to limit the scope of the claimed invention.

Furthermore, it is understood that for any given component or embodiment described herein, any of the possible candidates or alternatives listed for that component may generally be used individually or in combination with one another, unless implicitly or explicitly understood or stated otherwise. Additionally, it will be understood that any list of such candidates or alternatives is merely illustrative, not limiting, unless implicitly or explicitly understood or stated otherwise.

In addition, unless otherwise indicated, numbers expressing quantities, constituents, distances, or other measurements used in the specification and claims are to be understood as being modified by the term "about," as that term is defined herein. Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

Any headings and subheadings used herein are for organizational purposes only and are not meant to be used to limit the scope of the description or the claims.

Figure 1:
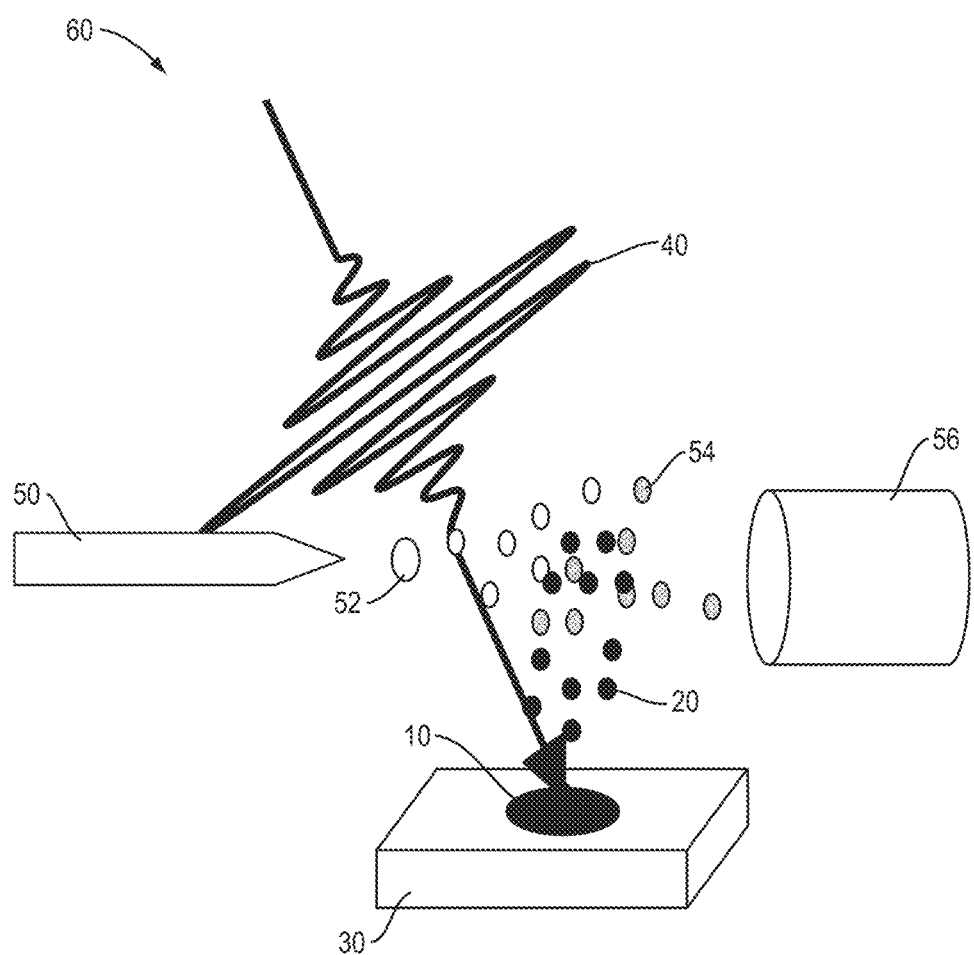
FIG. 1 illustrates a conventional laser assisted electrospray ionization (LAESI) system.

FIG. 1 illustrates a conventional LAESI system 60. As shown, laser light 40 is directed to a sample 10 disposed on a sample slide 30. The laser light 40 is tuned to cause ablation of a portion of the sample 10, resulting in an ablation plume 20 that propagates upward in a direction opposite the direction of laser light propagation. An electrospray needle 50 is disposed above the sample slide 30 at a height between the sample slide 30 and the optics through which the laser light 40 is passed. The electrospray needle 50 emits electrospray droplets 52 across the path of the ablation plume 20. Some of these droplets 52 will interact with droplets of the ablation plume 20 to form ionized sample droplets 54. A mass spectrometer inlet 56 is typically aligned with the electrospray needle 50 and positioned to receive some of the ionized sample droplets 54 for analysis.

While conventional LAESI systems such as system 60 enable the collection and analysis of ablated portions of a sample 10, several limitations exist. In particular, inherent spatial constraints severely limit the resolution at which the laser light 40 may be applied to the sample 10, meaning that spot sizes are relatively large, typically much larger than whole cells. In order for the stream of electrospray droplets 52 to cross the ablation plume 20, the electrospray needle 50 and the mass spectrometer inlet 56 must be positioned between the sample slide 30 and the optical assembly through which the laser light 40 is propagated. This limits the focus potential of the system and leaves the optics with less than desirable NA. In addition to the spatial constraints, it may also require the optics to focus through the stream of electrospray droplets 52 to focus on the sample 10.

Another disadvantage of such a conventional LAESI system 60 is that the direction of propagation of the laser light 40 (i.e., the k vector of the laser light) runs against the direction the ablation plume 20 must travel in order to reach the crossing path of electrospray droplets 52. This reduces the efficiency of transporting the ablated material to the mass spectrometer inlet 56. In addition, the spatial positioning of the components means that debris from the ablation plume 20 can dirty the optics and other overlying components, further degrading performance of the system and increasing operational costs for cleaning and/or part replacement.

Imaging and Ablation System Overview

Figure 2:
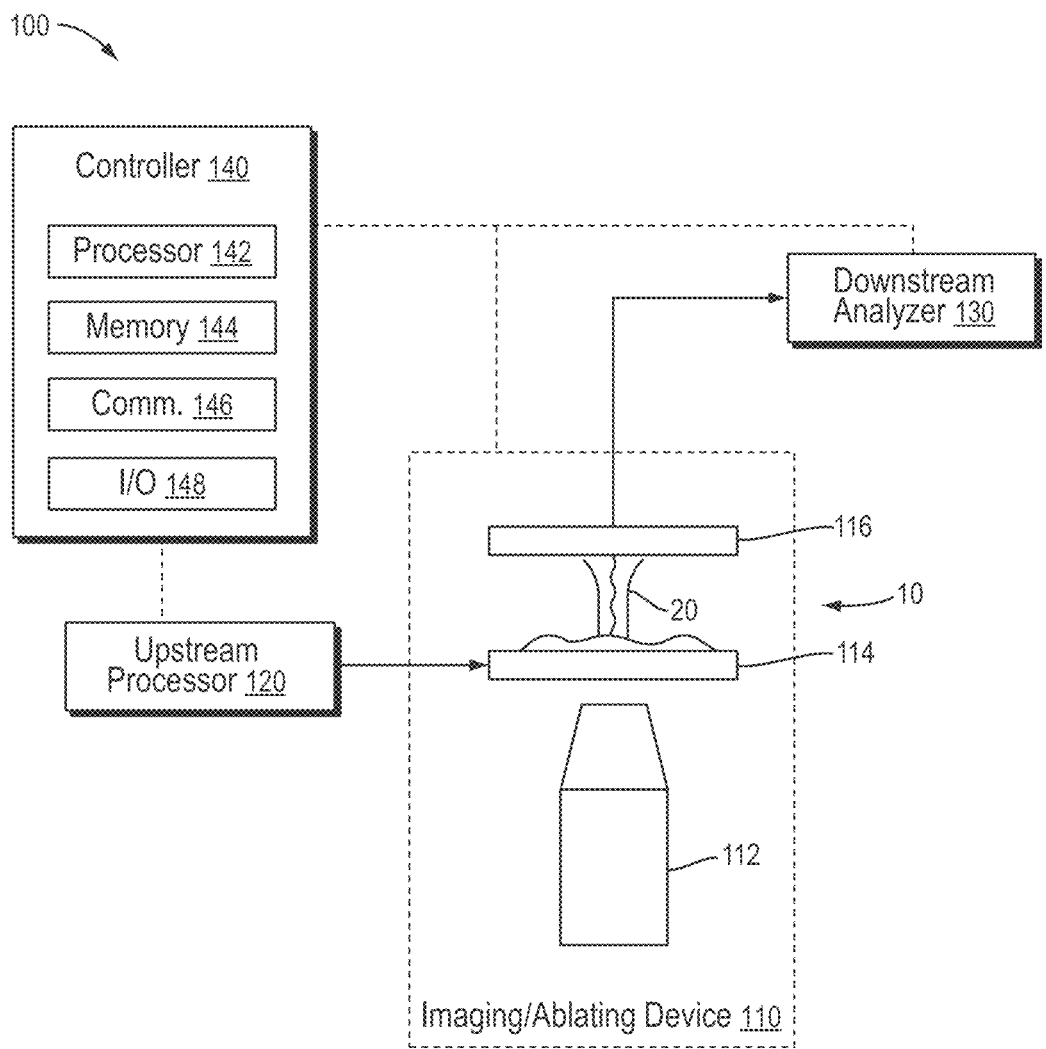
FIG. 2 illustrates a schematic overview of a system for imaging and ablation of a sample that provides one or more benefits over conventional imaging and ablation systems, the system including an imaging/ablating device with an optical assembly, sample stage, and receiver.

FIG. 2 illustrates a schematic overview of a system 100 for imaging and ablation of a sample. The illustrated system 100 may improve upon one or more of the limitations of the conventional LAESI system 60 as described above. The system 100 includes an imaging/ablating device 110. The imaging/ablating device 110 includes an optical assembly 112, a sample stage 114, and a receiver 116. As shown, the optical assembly 112 is disposed in an inverted position below the sample stage 114 such that light propagates upward through the optical assembly 112 and into the sample stage 114.

In operation, light for imaging and/or ablation passes through the optical assembly 112, then through the sample stage 114 and into a sample 10 positioned on the sample stage 114 (e.g., on a sample slide which is itself positioned on the sample stage 114). The same optical assembly 112 may be used for both imaging of the sample 10 and for ablation of a targeted region of interest within the sample 10. During ablation, a region of interest within the sample 10 is targeted, and laser light is directed through the optical assembly 112 and into the region of interest. The directed laser light may be tuned to cause the region of interest to ablate and form an ablation plume 20 that extends away from the sample stage 114 toward the receiver 116. The receiver 116 is positioned above the sample stage 114 such that at least a portion of the extending ablation plume 20 may be captured at the receiver 116. The sample stage 114, the receiver 116, or both may include positioning systems that allow them to be selectively moved in at least two axial directions, preferably in all three axial directions.

In contrast to the conventional LAESI system 60, the illustrated imaging/ablating device 110 provides the optical assembly 112 in an inverted position. This beneficially provides greater freedom in positioning the optical assembly 112 relative to the sample stage 114, allowing for the use of higher NA optics. The higher NA optics, in turn, enable focusing on smaller regions of interest and smaller ablation spot sizes. As explained in more detail below, some embodiments may enable ablation spot sizes at the sub-cellular level.

The illustrated imaging/ablating device 110 is also configured to direct laser light into the direction of ablation plume 20 extension. In the illustrated imaging/ablating device 110, the ablation plume 20 is intended to extend in the same direction as the propagating laser light, rather than against it as in the conventional LAESI system 60. The illustrated imaging/ablating device 110 is therefore able to provide effective transfer of ablated sample material to the receiver 116 without requiring the ablation plume 20 to travel against the direction of propagating laser light.

In addition, the configuration of the illustrated imaging/ablating device 110 removes the optical assembly 112 from the path of the extending ablation plume 20. This beneficially limits optical degradation and/or component damage resulting from ablated debris contacting or collecting on the optical assembly 112.

The receiver 116 may be configured to spatially and/or temporally differentiate the received individual subsamples of ablated material (i.e., the material corresponding respectively to each ablation event). In some embodiments, the receiver 116 includes a medium configured for spatial differentiation of the individual subsamples, such as a microwell plate or a nanodroplet array. Such media allow for subsequent analysis of the collected and spatially differentiated subsamples, such as PCR of nucleic acid within the ablated materials or sequencing of nucleic acid within the ablated materials.

The receiver 116 may additionally or alternatively include an electrospray probe. The electrospray probe may be utilized to generate ionized sample droplets for transmission to a mass spectrometer inlet. The receiver 116 may also be configured as a solvent-wetted surface. The solvent may have a flow rate such that received ablated subsamples are spatially differentiated based temporally on when they were ablated and received.

In some embodiments, the electrospray probe and the wetted surface are combined. For example, as explained in more detail below, the electrospray probe may be partially disposed within a capillary, with an exposed distal portion that extends out of the capillary and terminates at a tip. The exposed distal portion is positioned to receive the ablated subsamples from the sample stage (i.e., is positioned above the sample stage). The capillary is configured to apply the solvent to an outer surface of the electrospray probe such that the solvent flows along an outer surface of the exposed distal portion toward the tip of the electrospray probe. In this manner, as ablated subsamples are captured by the exposed distal portion, they then flow toward the tip of the probe where they are ionized and transmitted toward a mass spectrometry inlet.

The receiver 116, and in particular the portion of the receiver that initially contacts and receives the ablation plume 20, may be spaced from the upper surface of the sample stage by a distance of about 1 mm or less, or by about 500 μm or less, or by about 350 μm or less, or about 250 μm or less, or about 200 µm or less, or by about 150 µm or less. Dimensions within the foregoing ranges have been found to provide effective collection of ablated material by the receiver.

The distance between the sample and the portion of the receiver 116 that initially receives the ablation plume 20 may also be tailored to provide effective transfer of the ablated material to the receiver 116. Ablated materials will displace from the sample with kinetic energy (quadratic with velocity), but will experience a drag force (quadratic with velocity) that decelerates the materials and removes the kinetic energy. All kinetic energy will be removed over a distance L of about:

$$L = \left(\frac{h}{C}\right)\left(\frac{\rho s}{\rho g}\right)$$

where h is the thickness/height of the ablated portion of the sample, ρs is the sample density, ρg is the gas density, and C is the drag coefficient (usually about 1). Typically, L works out to be approximately 700 h. The distance between the upper surface of the sample and the receiver is therefore preferably less than L, or in other words, is preferably less than about 700 times the height of the ablated portion of the sample.

In some embodiments, the imaging/ablating device 110 includes an incubation container (not shown) configured in size and shape to be disposed between the sample stage 114 and the receiver 116 and configured to provide an incubation environment for the sample 10 placed upon the sample stage 114.

The illustrated system 100 may also include an upstream processor 120 configured to sort, spatially orient, and/or otherwise process a sample prior to positioning of the sample on the sample stage 114. For example, the upstream processor 120 may include a sorting device such as an electrical droplet sorter for sorting cells or other sample components onto a sample slide, the sample slide being configured for subsequent placement upon the sample stage 114. The upstream processor 120 may additionally or alternatively include a centrifuge, such as a Cytospin™ centrifuge. The centrifuge may be configured, for example, to spin a cell suspension onto a slide, with the slide being configured for subsequent placement upon the sample stage 114. Other upstream processing components as known in the art for sorting and positioning samples and/or cells may additionally or alternatively be included in the upstream processor 120.

Figure 3:
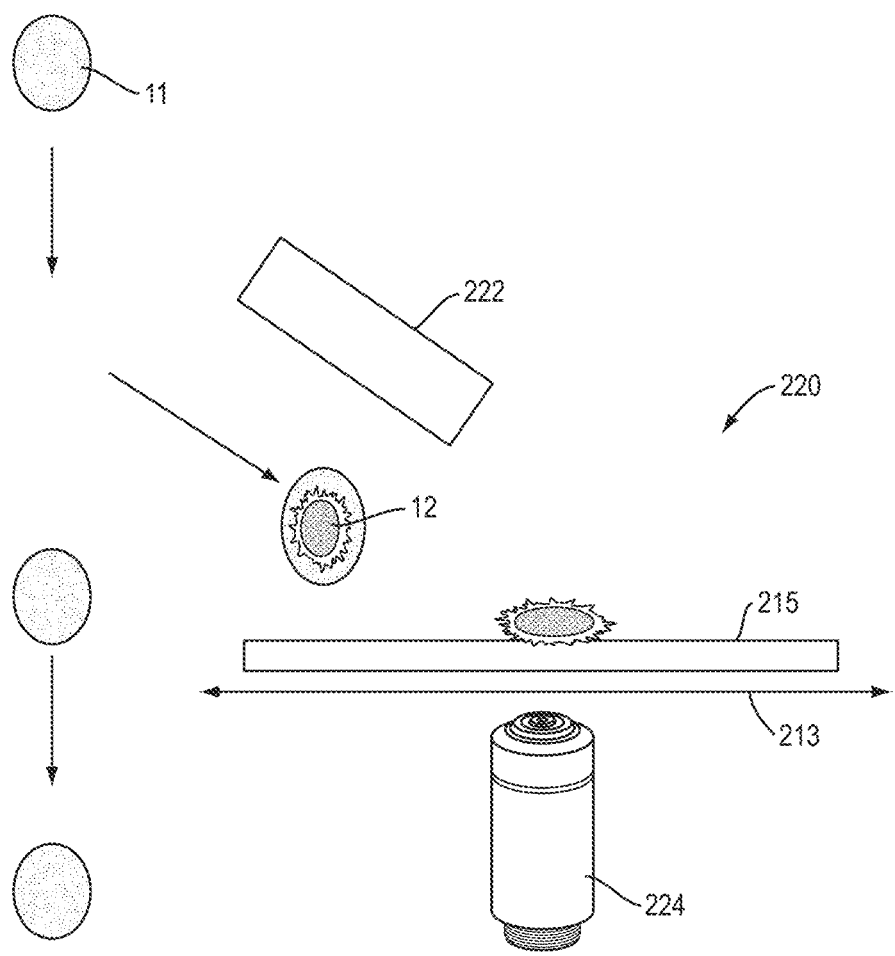
FIG. 3 illustrates an exemplary upstream processor in the form of an upstream electrical droplet sorter.

One example of an upstream processor is an electrical droplet sorter 220 as illustrated in FIG. 3. A series of droplets 11 may be passed near a deflector 222 (e.g., one or more electrodes), which operates to selectively deflect droplets of interest, such as those containing cells 12. The cells 12 may be directed to an imaging slide 215 positioned on a responsive stage 213. The responsive stage 213 may sequentially move to provide space on the slide 215 as additional droplets are sorted onto the slide 215. The slide 215 may have reference marks allowing the spatial position of the individual sorted droplets to be referenced. A camera 224 allows the positions of the individual sorted droplets to be recorded, which may also be correlated to droplet flow data (e.g., timing data indicating when each individual sorted droplet was sorted from the flow of droplets).

After a desired number of droplets have been sorted onto the slide 215, the slide 215 may be transferred to the sample stage 114 such as illustrated in FIG. 2. The positions of the individual sorted droplets on the slide 215, as recorded by the camera 224, may be correlated to images obtained using the imaging/ablation device 110. Thus, ablated subsamples may be traced back to images obtained using the imaging/ablation device 110, then back to spatial position on the slide 215, and ultimately back to the droplet flow data.

Additional or alternative upstream processing operations may include fixing cells to a slide. As explained above, however, the systems, devices, and methods described herein are able to perform imaging and ablation of live cells under ambient conditions, and thus fixing cells is not a necessary pre-processing step. Other additional or alternative upstream processing operations may include staining the sample, and/or adding a label to the sample.

Referring again to FIG. 2, the illustrated system 100 may also include a downstream analyzer 130 configured to receive ablated sample from the receiver 116 for further analysis. The downstream analyzer 130 may include, for example, a PCR machine, a sequencing machine, an optical spectrometer, a mass spectrometer, or combinations thereof. Other biomolecule analysis devices as known in the art may additionally or alternatively be included. Where a mass spectrometer is included, the analyzer 130 may include one or more of, for example, a time of flight (TOF) mass spectrometer, an Orbitrap™ mass spectrometer, a linear ion trap mass spectrometer, a quadrupole mass spectrometer, a quadrupole ion trap mass spectrometer, a magnetic sector mass spectrometer, or a Fourier transform ion cyclotron resonance (FTICR) mass spectrometer.

The illustrated system 100 may also include a controller 140 communicatively coupled to one or more of the other components of the system to provide control and/or feedback of the system 100. The controller 140 includes one or more processors 142, memory 144 (e.g., on one or more hardware storage devices), and a communications module 146 for controlling the sending and receiving of data between the controller and the various components of the system 100 to which the controller 140 is coupled. The controller 140 may also include input/output hardware 148 as known in the art for receiving input from a user and/or for displaying information to a user.

Additional details and embodiments related to the system 100 are described below. It will be understood that the embodiments described below may be provided in any combination and utilized in conjunction with the overall system 100 as described above. In the embodiments described below, like numbers may be used to refer to like components.

Optical Assembly

Figure 4:
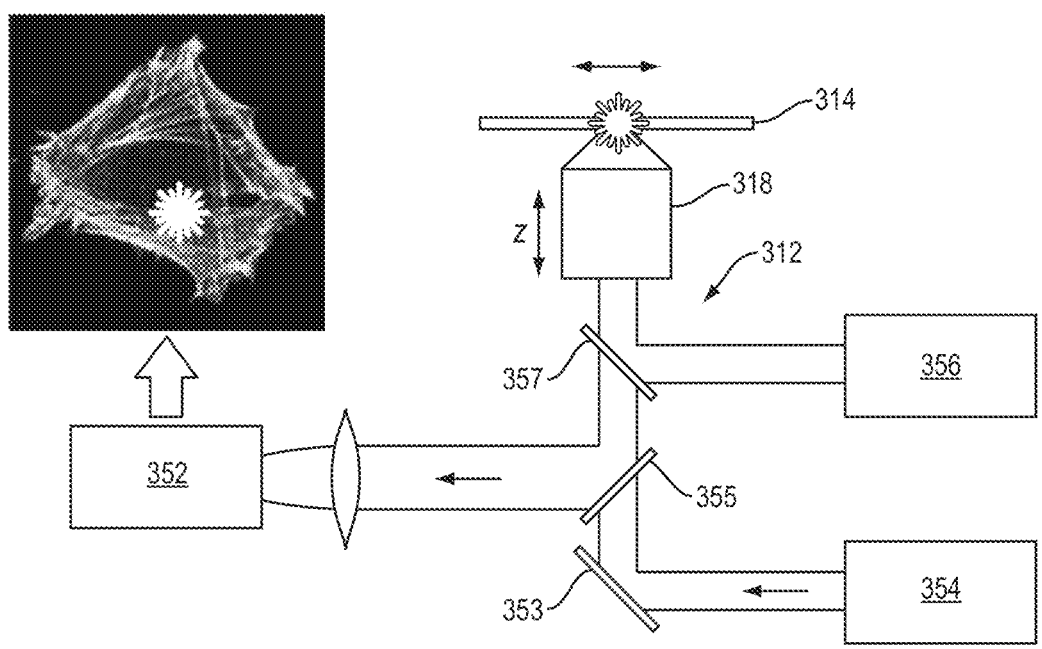
FIG. 4 illustrates an example of an optical assembly that may be utilized in an imaging/ablating device as described herein.

FIG. 4 schematically illustrates one example of an optical assembly 312 that may be utilized in an imaging and ablating system such as system 100 described above. In some embodiments, the optical assembly 312 is configured to provide for epifluorescence imaging. The optical assembly 312 may include an objective 318 that preferably has an NA of about 0.5 or more, or about 0.65 or more, or about 0.75 or more, or about 0.8 or more. The optical assembly 312 also includes an imaging light source 356, an ablation light source 354 (i.e., ablation laser source 354), and a camera 352 (e.g., a charge-coupled device (CCD) or CMOS camera).

The optical assembly 312 may also include one or more dichroic beamsplitters/mirrors, such as dichroics 355 and 357. Dichroic 357, for example, is configured to reflect excitation light, or a portion thereof, from the imaging light source 356 toward the objective 318, and to allow passage of emission light emitted back to the objective 318 by the sample. The emitted light may then be reflected by dichroic 355 toward the camera 352. One or more filters may also be positioned along the optical path in order to filter/block source light and/or reflected excitation light as desired for particular application needs. For example, one or more excitation filters may be utilized to suppress unwanted background from the excitation light source, one or more emission filters may be utilized to suppress unwanted fluorescence background emanating from the sample, and/or other known filter elements as desired. The dichroic 355 may also function to allow passage of ablation light from the ablation light source 354 toward the objective 318. One or more mirrors/filters 353 may also be included for manipulating the laser light along the optical path between the source 354 and the objective 318.

The imaging light source 356 may include a xenon arc lamp, mercury-vapor lamp, or LEDs, for example. The ablation light source 354 preferably includes an infrared laser (e.g., near infrared or "NIR"). The ablation laser is also preferably a femtosecond laser. The laser may also be configured to enable two photon imaging using the objective 318. The ablation light source 354 may be used in addition to or as an alternative to the light source 356 for imaging purposes as well as for ablation. For example, as described below, an NIR source may be utilized at low pulse energies to obtain imaging information and at high pulse energies for ablation.

The use of NIR from the ablation light source 354 may be particularly advantageous for the intended ablation operations, in particular as compared to the use of ultraviolet (UV) light. For example, meaningful interaction of ablation light with a targeted biological sample is limited by the scattering of light at the structures of the biological material (e.g., changes of refractive index at membranes, nuclei, vesicles, etc.). This causes a loss of information and can make it difficult to focus targeted information on a detector in a meaningful manner. The applied ablation light will also be affected by phase shift and loss on the biological structures, and by absorption of light by the biological structures. Because these limitations are primarily a function of wavelength of the applied light, the limitations are more relaxed when NIR light is utilized. Configuring the ablation light source 354 as an NIR source therefore has better resolution and sample penetration depth as compared to UV applications (such as UV MALDI applications).

Moreover, to achieve super resolution better than about 20 nm via localization, one is limited to a penetration depth of about 1 μm of the thickness of a typical fixated biological sample. For a standard visible (VIS) range resolution or about 250 nm, the penetration depth is about 10 to 20 μm maximum. In the case of NIR, the penetration depth is much higher for two photon excitation, such as up to about 100 μm. The use of NIR thus beneficially allows for deeper penetration into the target sample tissue, and enables the ablation even of relatively complicated tissues (e.g., brain). The enhanced depth penetration and resolution also increases the chances that remaining material survives and/or retains structural information following laser manipulation. Further, whereas imaging of thicker samples is not feasible in the VIS range, two photon imaging using low NIR pulse energies beneficially allows imaging at greater depths and therefore allows for better volume information.

Although the exemplary optical system 312 is illustrated herein, it will be understood that other optical components for imaging and/or ablation, including other dichroics, filters, mirrors, light sources, cameras, and/or other optical components as are known in the art, may be additionally or alternatively included to provide other imaging modalities. The optical assembly 312 may also be configured, for example, to enable brightfield imaging and/or sectioning (e.g., using confocal imaging components). Optical assemblies described herein may be configured to provide independent focus control for each of imaging and ablation. That is, one or more adaptive optics assemblies may be included to provide, for example, dynamic control of ablation spot size within a given imaging field of view.

When used for ablation of a region of interest, the laser may be configured to deliver pulse energies of about 1 nJ up to about 20 μJ for a given 1 μm×1 μm×2 μm voxel. Larger regions of interest are capable of absorbing more energy and are therefore able to withstand larger absolute pule energies. In other words, the laser may be configured to deliver pulse energies of about 0.5 nJ to about 10 μJ per μm$^3$.

The 10 μJ per μm$^3$ upper limit represents an upper limit before fragmentation and ionization is expected to excessively occur, and thus represents the upper limit where preservation of the ablated region of interest is desired. As explained in more detail below, however, in some implementations it may be desired to fragment/ionize a targeted region by delivering one or more pulses above the 10 μJ per μm$^3$ upper limit. Briefly, for example, it may be desirable to focus the laser on a volume of media above a region of interest within a cell and to blow off the overlying media prior to then ablating the region of interest within the cell. This process could provide greater clearance for the ablated region of interest to travel from the sample stage to the receiver (see related discussion corresponding to FIG. 11).

As mentioned above, the imaging/ablating devices described herein are beneficially capable of targeting relatively small regions of interest. The optical assembly may be configured to provide a spot size diameter of a targeted region of about 50 μm or less, or about 30 μm or less, or about 10 μm or less, or about 5 μm or less, or about 3 μm or less, or about 1.5 μm or less, or about 1 μm or less, for example. In terms of volume, the optical assembly may be configured to ablate a targeted region of about 500 μm$^3$ or less, about 250 μm$^3$ or less, about 100 μm$^3$ or less, about 50 μm$^3$ or less, about 25 μm$^3$ or less, about 10 μm$^3$ or less, about 5 μm$^3$ or less, or about 2 μm$^3$ or less.

In some implementations, the optical assembly may be configured to ablate a whole cell or a collection of multiple cells. In other implementations, the optical assembly may be configured for ablating targeted regions of sub-cellular size, such as particular organelles or other intracellular regions, or particular extracellular regions.

Ablated Sample Receiver

Figure 5:
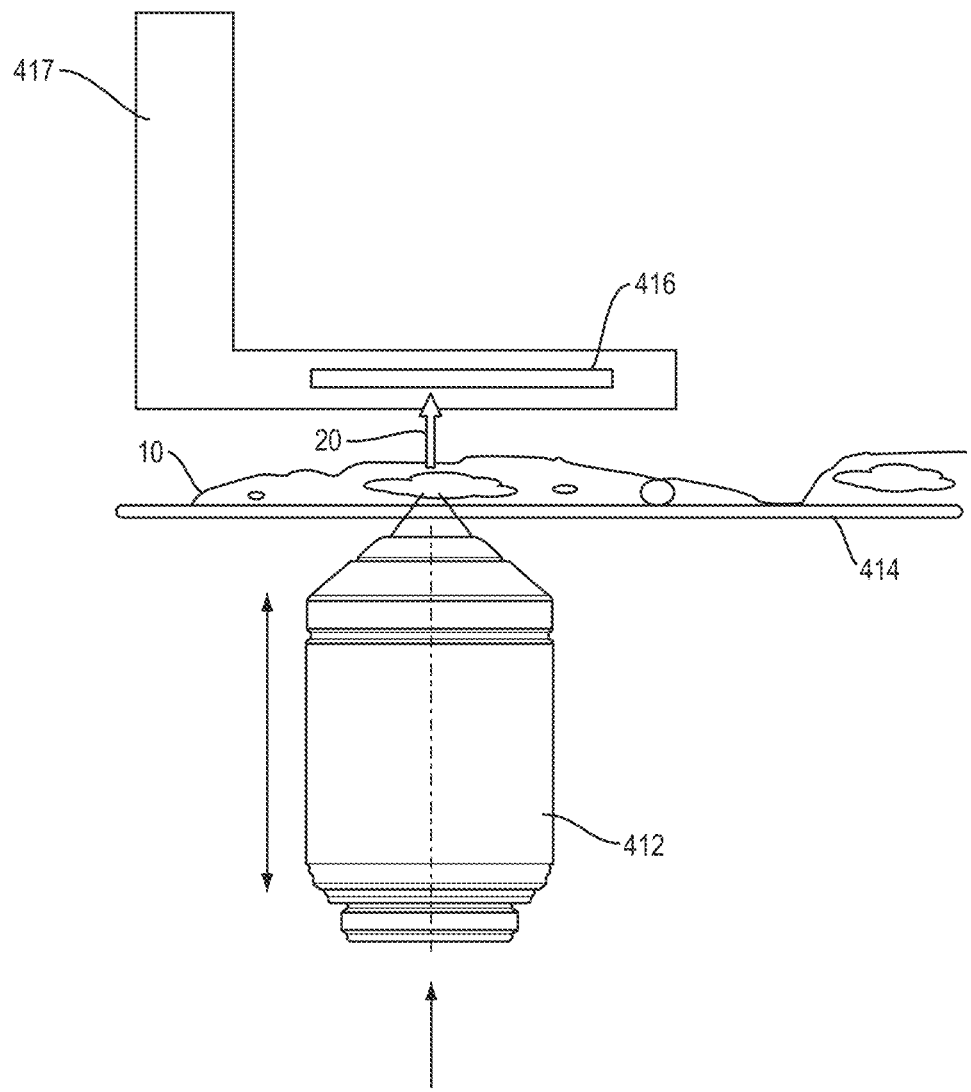
FIG. 5 illustrates an example of a receiver that includes a spatially-differentiated medium such as a microwell plate.

FIG. 5 illustrates an example of a receiver 416 that includes a spatially-differentiated medium, such as a microwell plate, microwell chip, nanodroplet array, or other structure capable of receiving individual ablated subsamples and maintaining the separate subsamples in different, spatially separated compartments. The receiver 416 may be attached to a receiver stage 417 capable of being selectively moved in at least two axial directions, more preferably in all three axial directions.

As described in relation to other embodiments above, the optical assembly 412 is configured to provide imaging and/or ablation of a sample 10 placed upon the sample stage 414. During ablation, the resulting ablation plume 20 extends upward toward the receiver 416 where it is collected and spatially differentiated from other ablated subsamples. When a desired number of subsamples have been collected, or when the receiver 416 is full, it may be removed from the receiver stage 417 and passed to an analyzer for further processing and/or analysis of the collected subsamples.

Figure 6A:
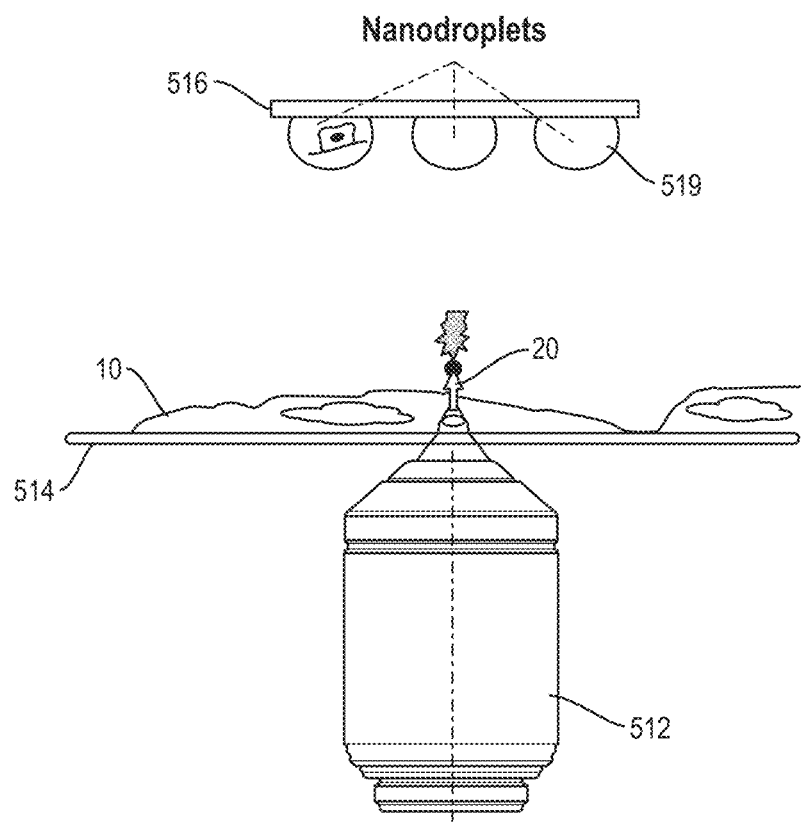
FIG. 6A illustrates an example of a receiver that includes a nanodrop array.

FIG. 6A illustrates a particular embodiment where the receiver 516 is configured as a nanodroplet array. As with other embodiments, the optical assembly 512 is configured to provide imaging and/or ablation of a sample 10 placed upon the sample stage 514. During ablation, the resulting ablation plume 20 extends upward toward the receiver 516 where it may be collected into a corresponding nanodroplet 519 or a series of such nanodroplets 519. The separate nanodroplets 519 thus form separate compartments that function to spatially separate the different ablation subsamples from separate ablation events. As above, when a desired number of subsamples have been collected, or when the receiver 516 is full, it may be removed from the receiver stage and passed to an analyzer for further processing and/or analysis of the collected subsamples.

Figure 6B:
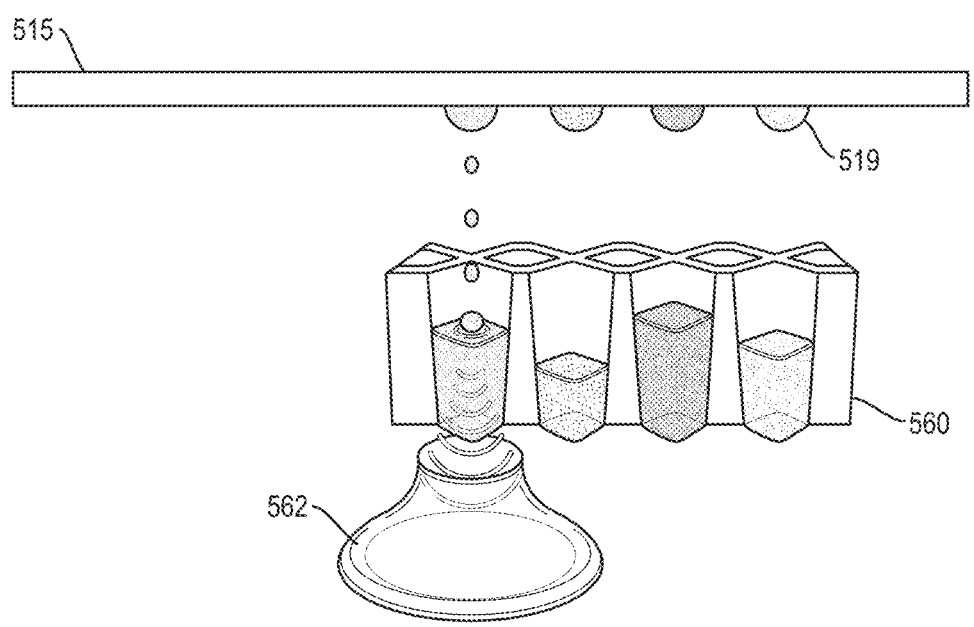
FIG. 6B illustrates an example process for forming a nanodrop array.

FIG. 6B illustrates an exemplary process for forming a nanodroplet array such as included in receiver 516. An acoustic transducer 562 may be utilized to apply acoustic energy to separate barcode solutions in a barcode array 560. The resulting nanodroplets are transmitted from the barcode array 560 to an overlying slide 515. The nanodroplets 519 may include different barcodes and therefore be ready for subsequent analysis of the ablated subsamples captured by the nanodroplets, such as subsequent PCR or sequencing of captured nucleic acid. The barcodes may be correlated to the spatial position of the nanodroplets 519 on the slide 515.

Figure 7:
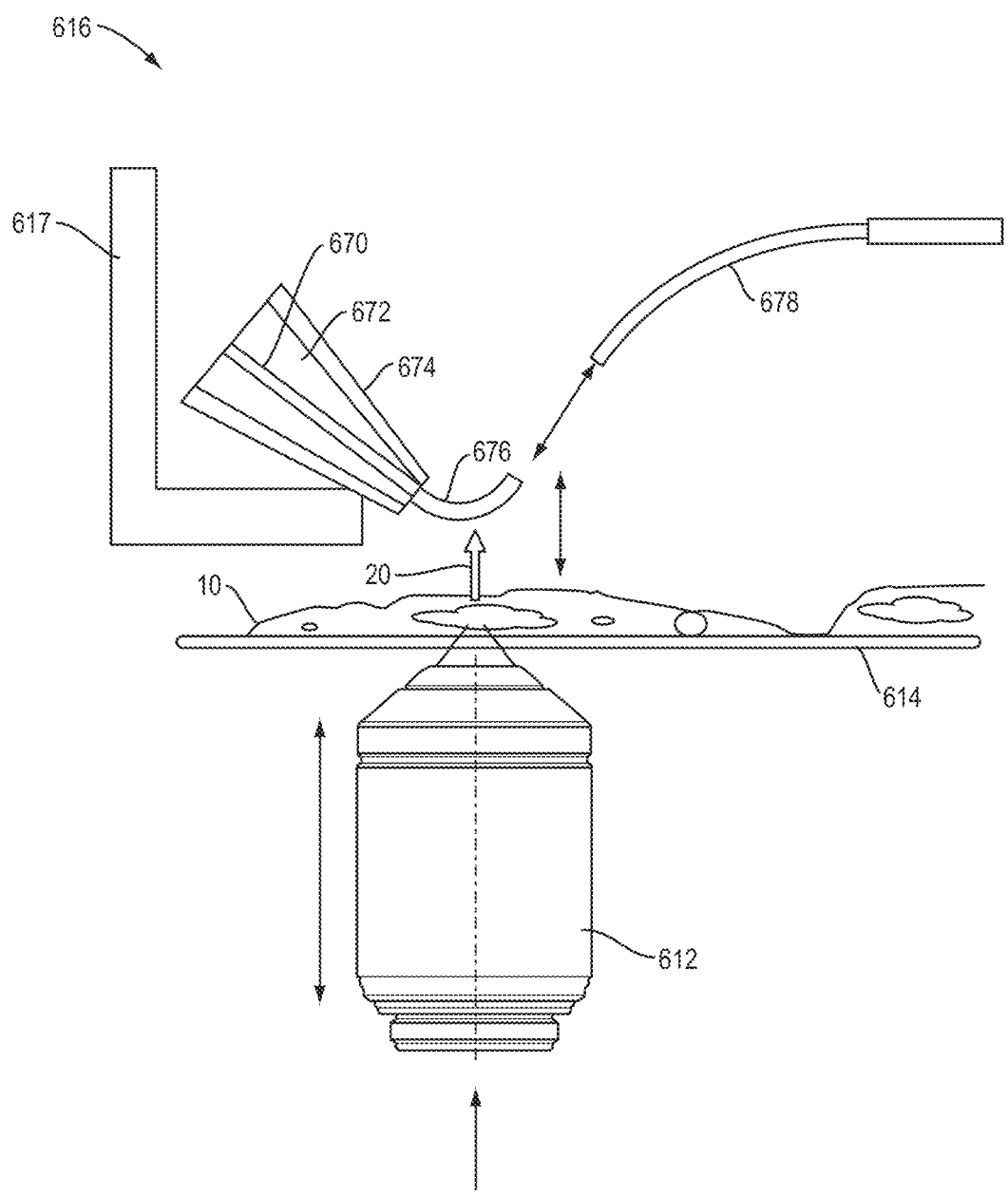
FIG. 7 illustrates an embodiment of a receiver that includes an electrospray probe and is configured for generating ionized droplets containing ablated subsamples for transmission to an inlet of a mass spectrometer.

FIG. 7 illustrates an embodiment of a receiver 616 that includes an electrospray probe 670. This type of receiver may be particularly useful for generating ionized droplets containing ablated subsamples for analysis via mass spectrometry. The electrospray probe 670 passes through a capillary 674. An exposed distal portion 676 of the probe 670 extends beyond the distal end of the capillary 674. A solvent 672 is disposed within the capillary 674 and flows out to wet the surface of the exposed distal portion 676. The capillary 674 is configured apply the solvent 672 such that the solvent 672 flows along an outer surface of the exposed distal portion 676 toward the tip of the electrospray probe 670. The tip of the electrospray probe 670 forms electrospray droplets and directs them toward a mass spectrometer inlet 678. The solvent may include, for example, water and/or one or more volatile organic compounds such as methanol, acetonitrile, acetic acid, and the like.

As shown, the wetted surface of the exposed distal portion 676 may be positioned above the ablation plume 20 so that the ablated subsample is collected on the wetted surface during ablation of the sample 10 using optical assembly 612. The positioning systems of the sample stage 614 and receiver stage 617 may be coordinated to align the ablation plume 20 with the exposed distal portion 676. The flow rate of the solvent 672 may be controlled according to ablation frequency to ensure effective spatial separation of successive subsamples captured by the flowing solvent 672 on the wetted surface of the exposed distal portion 676.

In contrast to conventional LAESI systems, which ionize a relatively small fraction of the ablated material, the illustrated configuration has been found to be capable of ionizing the ablated material with an efficiency of about 20% or more, about 35% or more, about 50% or more, about 65% or more, about 80% or more, about 90% or more, about 95% or more, or about 99% or more.

Ablated Sample Analyzer

As discussed above, a downstream analyzer may be utilized to further process and/or analyze the ablated subsamples collected by the receiver. Depending on the type of processing and/or analysis desired, the downstream analyzer may include one or more, for example, PCR machines, sequencing machines, optical spectrometers, nuclear magnetic resonance (NMR) spectrometers, mass spectrometers, chromatography devices, centrifuges, electrophoresis devices, radiolabeling and radiolabel detection devices, other analytical biochemistry devices, or combinations thereof.

Where a mass spectrometer is included, the analyzer may include one or more of, for example, a time of flight (TOF) mass spectrometer, an Orbitrap mass spectrometer, a linear ion trap mass spectrometer, a quadrupole mass spectrometer, a quadrupole ion trap mass spectrometer, a magnetic sector mass spectrometer, or a Fourier transform ion cyclotron resonance (FTICR) mass spectrometer.

Where a sequencing is utilized, the sequencing machine may be configured to perform next generation sequencing (NGS), also sometimes referred to as a high-throughput sequencing. Suitable sequencing modalities include 454 pyrosequencing, ion torrent sequencing, nanopore sequencing, synthesis sequencing (i.e., Illumina sequencing) and/or other sequencing methods that are known or will be developed in the art. More traditional chain termination methods (e.g., Sanger sequencing) may also be utilized.

Figure 8:
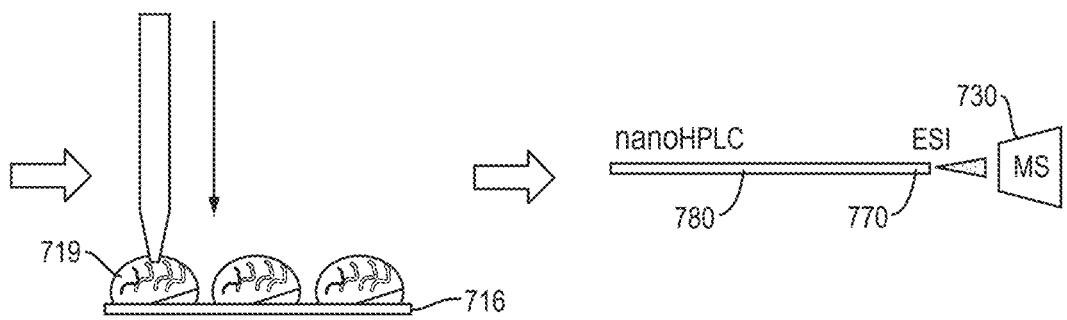
FIG. 8 illustrates one example of a downstream process where one or more reagents may be added to spatially separated compartments of a receiver and/or that one or more subsamples may be passed to a liquid chromatography column that is coupled to an electrospray probe for passing ionized samples to a mass spectrometer.

FIG. 8 illustrates one example of a downstream process where one or more reagents may be added to the spatially separated compartments (nanodroplets 719 in this example) of the receiver 716. One or more reagents may be added to perform, for example, cell lysis, protein extraction, reduction, alkylation, digestion, and/or other desired reactions for preparing the collected subsamples.

FIG. 8 also illustrates that subsamples may additionally or alternatively be transferred to a liquid chromatography mass spectrometry (LC MS) system. For example, subsamples may be passed to a liquid chromatography column 780 that is coupled to an electrospray probe 770 for passing ionized samples to a mass spectrometer 730.

Operation Modes

Figure 9:
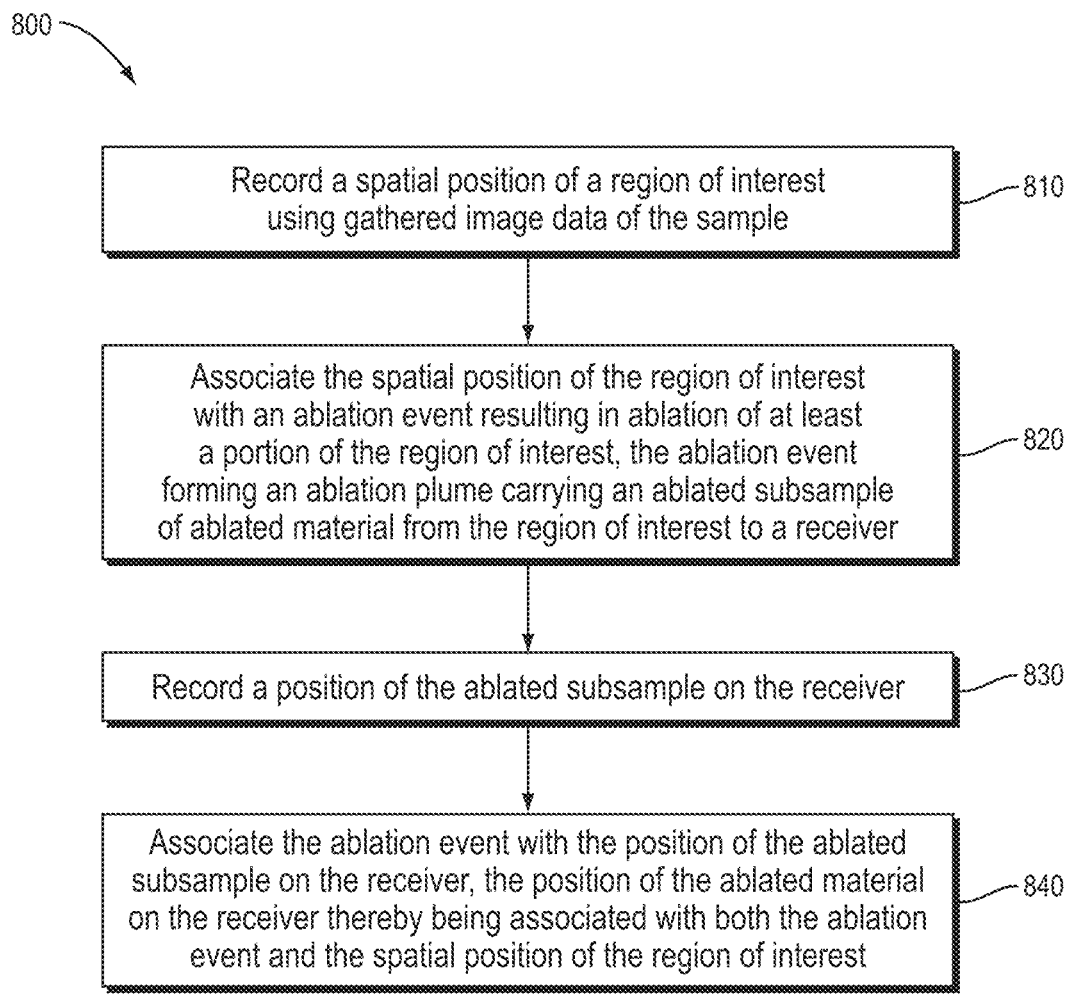
FIG. 9 illustrates an exemplary method for correlating the position of an ablated subsample on a receiver to an ablation event and to a targeted region of interest on the sample slide.

The devices and system described herein may be configured to perform various imaging and/or ablation processes. FIG. 9 illustrates an exemplary method 800 for correlating the position of an ablated subsample on a receiver to an ablation event and to a targeted region of interest on the sample slide. As described above, the region of interest on the sample slide may be further correlated to upstream sorting/flow data (see, e.g., FIG. 3 and associated description). The method 800 may be performed using a controller communicatively coupled to certain components of the system, such as the controller 140 described above in relation to system 100.

In the illustrated method, the controller may first record a spatial position of a region of interest using gathered image data of the sample (step 810). The imaging may be done using one or more of brightfield imaging, sectioning, epifluorescence imaging, and/or two-photon imaging, for example. Further, the imaging may be accomplished using the same objective through which ablation laser pulses are subsequently passed for ablating the targeted region of interest.

The controller may then associate the spatial position of the region of interest with an ablation event resulting in ablation of at least a portion of the region of interest, the ablation event forming an ablation plume carrying an ablated subsample of ablated material from the region of interest to a receiver (step 820). This step may therefore associate the temporal information of the ablation event to the spatial position of the region of interest on the sample slide.

The controller may then record a position of the ablated subsample on the receiver (step 830), and then associate the ablation event with the position of the ablated subsample on the receiver, the position of the ablated subsample on the receiver thereby being associated with both the ablation event and the spatial position of the region of interest (step 840). These steps may therefore enable the spatial position of the ablated subsample on the receiver to be associated with the corresponding temporal information of the ablation event and to the spatial position of the region of interest on the sample slide. The set of correlations thus allows for subsequent tracing of subsample data back to the corresponding temporal events and spatial positions that led to the subsample data.

During ablation, the laser pulse frequency, laser pulse energy level, and laser pulse depth may be independently varied to provide desired operational capabilities. In a standard implementation, for example, a single pulse may be directed at a fixed focus position. The pulse energy may be selected so as to optimize ablation, optimize plume formation, and/or minimize degradation of the transferred subsample.

Figure 10:
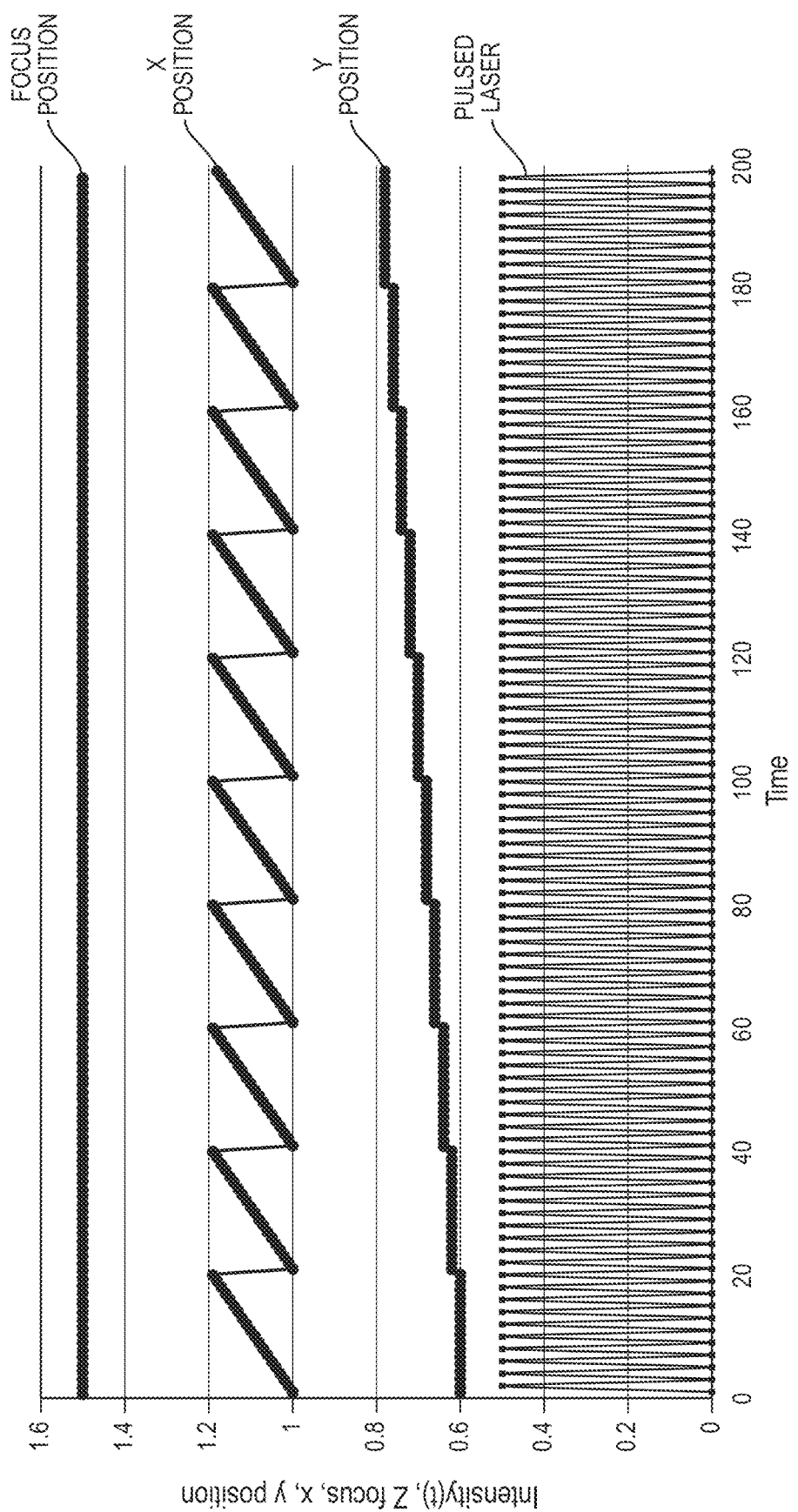
FIG. 10 graphically illustrates an example imaging/ablating device operation mode in which a rectangular xy area of a sample is scanned and ablated.

In other implementations, the depth of the applied laser pulse and/or the pulse energy level may be dynamically varied to provide desired effects. FIG. 10 graphically illustrates an example operation mode in which a rectangular xy area is scanned and ablated. The laser pulse frequency may be tuned to balance dwell time and pulse to pulse overlap. This type of implementation may be utilized to ablate entire structures (e.g., various organelles within a cell), or desired portions thereof, in a spatially coordinated manner Note that the units along the axes of the graph are for illustrative purposes only, and are not necessarily to definite scales.

Figure 11:
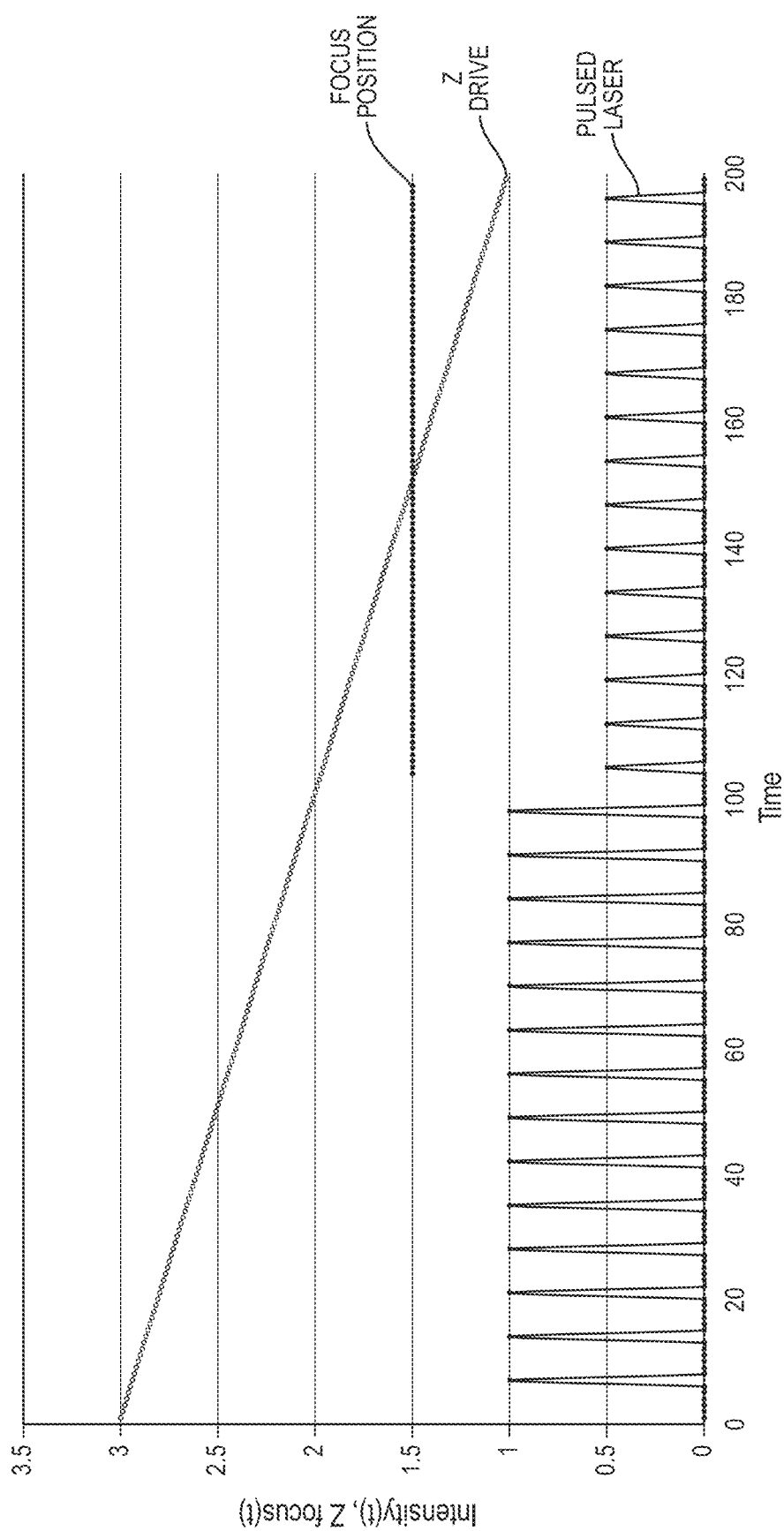
FIG. 11 graphically illustrates an example of an imaging/ablating device operation mode that may be utilized to remove a layer of tissue, media, or other obstructing material overlying the targeted region of interest by dynamically adjusting the position of the applied laser pulses and the pulse energy level.

FIG. 11 graphically illustrates another example of an operation mode that may be utilized where there is a layer of tissue, media, or other obstructing material overlying the targeted region of interest. The "z drive" line indicates movement of the applied laser pulses along an axial/vertical channel (i.e., along the z axis, which lies perpendicular to the plane of the sample stage defined by the x and y axes). The "focus position" line indicates the depth at which the targeted zone of interest resides. As shown, the upper layers initially undergo higher energy laser pulses that may be better tailored for removing the overlying material and opening up an axial channel. Once the dynamically moving laser pulses reach the depth of the region of interest, the laser pulse energy level may be decreased to a level more suited to ablation of the region of interest. The ablated material may then travel away from the sample and toward the receiver before the formed channel collapses back over the region of interest. Note that the units along the axes of the graph are for illustrative purposes only, and are not necessarily to definite scales.

An operation mode such as shown in FIG. 11 can beneficially allow for ablation of targeted regions that reside somewhat deeper within the sample as measured from the upper surface. For example, without first removing some of the overlying material, ablation may in some circumstances be limited to the upper 2 to 10 μm of the sample due to the need to transport the resulting plume upward to the receiver through any remaining overlying material. Dynamically configuring the operation mode such as in FIG. 11 can remove or lessen the amount of overlying tissue and therefore allow an ablation plume from a deeper region of interest to effectively transport to the receiver.

Imaging and ablating devices as described herein may also be operated to focus the ablation laser at a depth from the upper surface of the sample that is associated with the spatial resolution value (i.e., the shortest distance between two points on a specimen that can still be distinguished). That is, when the required spatial resolution value is relatively small, the maximum depth at which the ablation laser is focused is also smaller, and when the spatial resolution value required and/or utilized is greater, the maximum depth at which the ablation laser is focused is also greater. This approach allows for greater focus depths where the required spatial resolution value to effectively target the region of interest is sufficiently large, but limits the focus depths where the required spatial resolution value is small, thereby increasing the likelihood that the resulting ablation plume will be capable of successfully transporting from the sample to the receiver.

For example, the ablation laser may be focused at a depth, measured from the upper surface of the sample, that is no more than R times the spatial resolution, where R is a value of about 5 to about 30, such as a value of about 10, 15, 20, or 25. It will be understood, however, that depths greater than those dictated by the value of R may be ablated in at least some applications, such as where dynamic laser operation is utilized as with the operation illustrated by FIG. 11.

At least a portion of the sample disposed between the bottom surface of the sample and the point of laser focus may remain un-ablated. Thus, particular sub-sample volumes at particular depths may be targeted for ablation in a manner that allows successful transport of the resulting ablation plume to the receiver.

Laser Focus Detection Unit

Figure 12:
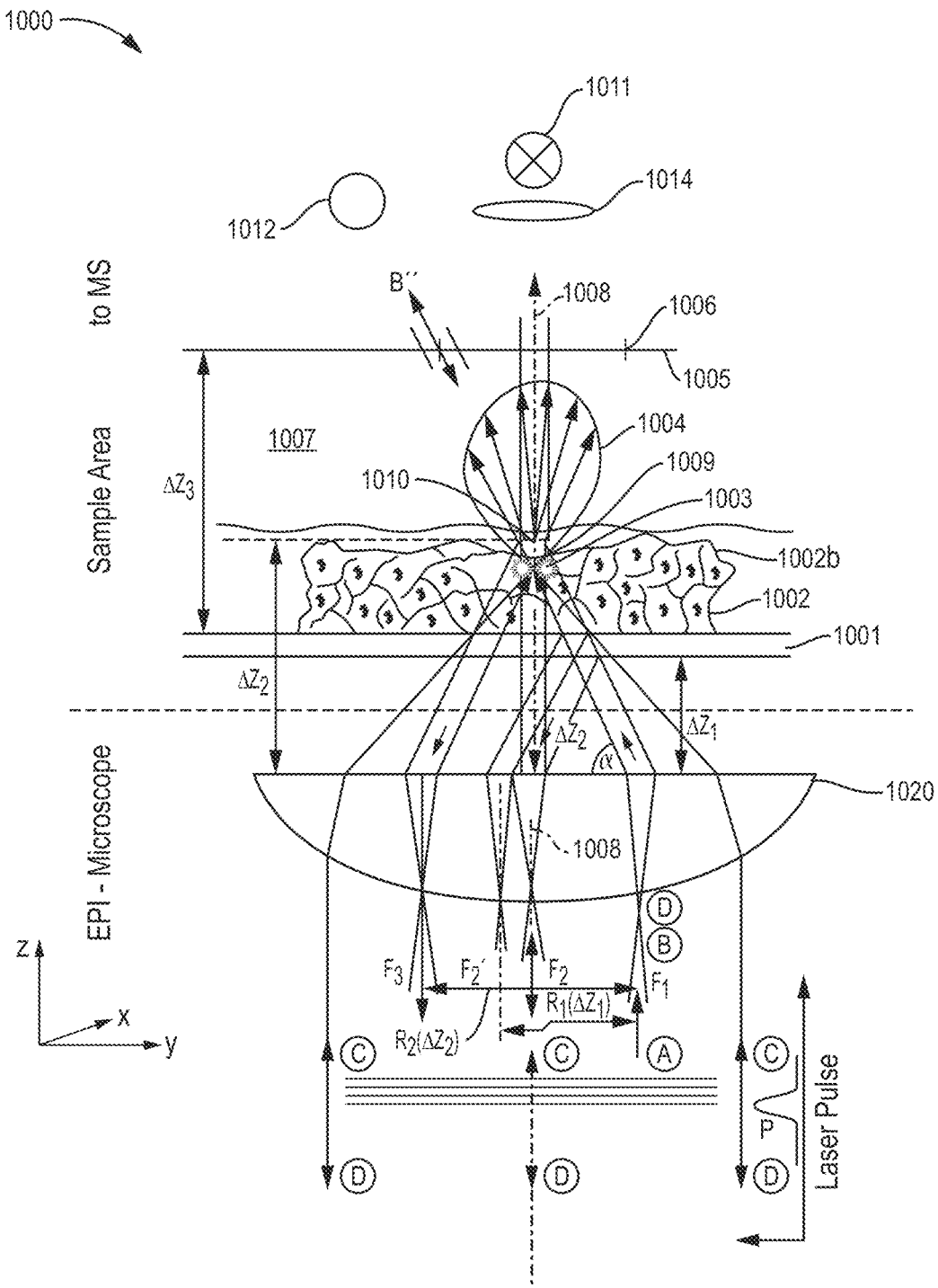
FIG. 12 illustrates an exemplary imaging/ablating device including a laser focus detection unit.

FIG. 12 illustrates an exemplary imaging/ablating device including a laser focus detection unit (FDU) 1000. The FDU can be utilized with any of the imaging/ablating devices referred to above with reference to FIGS. 2 to 11. An objective lens of choice 1020 (the device can be equipped with a plurality of different objectives, e.g. up to five objectives) focuses light through a transparent window of a sample stage 1001 and into a sample 1002. The optical axis of the system is indicated by arrow 1008. The sample stage 1001 comprises a transparent window, such as a glass or plastic window, e.g. a transparent slide or cover slip, or other transparent glass or plastic support, on which the sample is mounted. The transparent window may protect the sample from the atmosphere of the microscope or optical assembly. The sample 1002 can be a sample of one or more cells. The sample 1002 has a top layer of water 1002*b*, i.e. covering the cells. An atmosphere 1007, such as air, surrounds the sample. The atmosphere may comprise humidity/$CO_2$ flow control for live-cell experiments.

The arrows C represent the path or diameter of ingoing light beams, which can be an epi-illumination beam, laser pulse for ablation, or excitation light for fluorescence emission. The light beam C, such as laser light for ablation, is focused by the objective at a focus point 1003 in the sample. A cavity having diameter 1009 is initially generated in the sample at the focus 1003 by pulses of the ablation laser light. An ablation plume 1004 comprising ablated sample material is produced subsequently that expands from the sample at its surface with the atmosphere, typically with a $cos^2$ distribution. The ablation plume 1004 expands towards a receiver 1005 positioned above the sample, such as a receiver plate, an electrospray probe or an entrance to a mass spectrometer, for example. The area 1006 represents the projection of the plume 1004 on the receiver 1005.

A light source 1011, such as a flash lamp, allowing for (pulsed) trans-illumination snapshot imaging is positioned above the sample. A lens 1014 is provided for collimating light from the light source into the sample 1002.

Several light paths are indicated. Laser light from the ablation laser is indicated by the wave front A and pulse waveform with energy P, which follows path C. Path C generally represents the epi-illumination beam path of light going towards the sample from below, including the light from the ablation laser and excitation light for fluorescence emission. A reference laser beam of the focus detection unit (FDU) is indicated by beam path B. Path D indicates the light path for back-reflected light and fluorescence emission. A camera (such as a CCD) or a spectrometer, which is not shown in FIG. 12, receives light from path D to produce information that can be time resolved and/or spectrally resolved.

Laser light from a reference laser of the FDU in operation is reflected back from the surface 1010 of the sample. Transmitted laser light B″ from a reference laser of the FDU, which has been transmitted through the sample 1002, is shown. A fast photodetector 1012 is positioned to detect the transmitted laser light B″.

Figure 13:
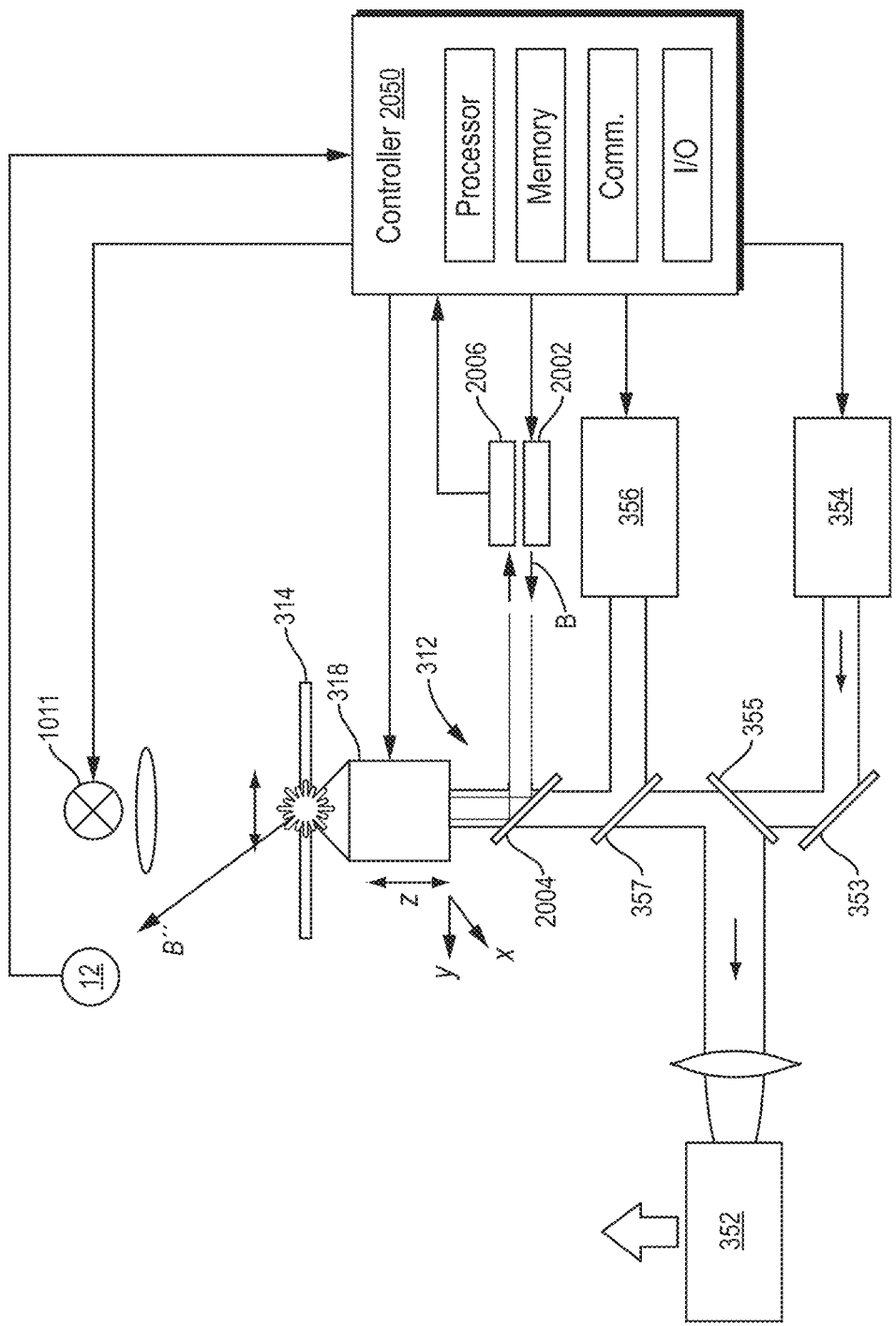
FIG. 13 illustrates schematically an exemplary optical system incorporating an imaging/ablating device and a laser focus detection unit.

The ablation system including the FDU schematically shown in FIG. 12 may be implemented using the exemplary optical system shown in FIG. 13. The optical system shown in FIG. 13 comprises many of the same components as the optical system schematically shown in FIG. 4 and these same components use the same reference numerals. The optical system shown in FIG. 13 additionally comprises an FDU including at least one reference laser 2002. Two reference lasers are utilized for the system shown in FIG. 12. The reference laser beams, shown generally by arrow B are reflected by the FDU dichroic beamsplitter/mirror 2004 to enter the objective 318. The reference laser(s) of the FDU are preferably near infrared or "NIR" lasers. In the shown embodiment, the reference laser beams consist of 905 nm laser light. The reference laser light is focused in the back focal plane (BFP) of the objective lens to form collimated light in the sample space. The dichroic 2004 reflects the 905 nm laser light only, with other wavelengths (e.g. UV, Visible, other NIR, etc.) passing the dichroic. Thus, the reference laser wavelength, together with the dichroic 2004, enables that the epi-microscope setup is independent of the FDU. Reflected reference laser beams that have been back-reflected from the sample stage and/or sample, which may include reflection from the generated cavity or ablation plume, are detected by an photodetector 2006. Further details of the FDU reference laser and detection are described with reference to FIGS. 14 and 15 below. The optical system in FIG. 13 is under the control of a controller 2050, which, like the controller 140 described for the system 100 above, comprises one or more processors, memory (e.g., on one or more hardware storage devices), and a communications module for controlling the sending and receiving of data between the controller and the various components of the system to which the controller is coupled. The sending/receiving of data to/from the controller is indicated by the arrows. The controller may also include input/output (I/O) hardware as known in the art for receiving input from a user and/or for displaying information to a user.

Referring to FIG. 12, several distances in the system are shown, which are to be monitored during the ablation process: $\Delta Z_1$ is the distance from the objective 1020 to the sample stage 1001 (i.e. the transparent window thereof), $\Delta Z_2$ is the distance from the objective 1020 to the reflection surface 1010 of the sample at the sample/atmosphere interface, and $\Delta Z_3$ is the distance from the sample stage 1001 to the receiver 1005.

Referring to FIG. 12, $F_1, F_2, F_3$ indicate the reference laser beams of the FDU. A first reference laser beam $F_1$ from a first reference laser of the FDU (laser #1) is directed into the objective of the optical system offset from the optical axis. The objective 1020 focuses the first reference laser beam $F_1$ towards the sample stage at an angle $\alpha$ to the objective. The angle $\alpha$ is dependent on the objective lens used. The first reference laser beam $F_1$ is focused at the objective lens to form parallel light in object space at the angle $\alpha$. The angle $\alpha$ can be used for triangulation to measure and/or control the relative distance $\Delta Z_1$ of the objective lens 1020 to sample stage 1001 and also the relative distance $\Delta Z_2$ of the objective lens 1020 to the sample surface 1010.

A part of the first reference laser beam $F_1$ is reflected from the sample stage (i.e. from the transparent window of the sample stage) resulting in first reflected reference laser beam $F'_2$. The reflected reference laser beam $F'_2$ is radially displaced within the objective with respect to the ingoing first reference laser beam $F_1$ with a radial distance $R_1$. The beam positions of first reference laser beam $F_1$ and reflected reference laser beam $F'_2$ and thus the distance $R_1$ between are detected by an array detector of the photodetector 2006 as shown in more detail with reference to FIGS. 14 and 15. The distance $R_1$ between the reference beams is a function of distance $\Delta Z_1$ and so is used to measure the distance of the objective lens 1020 to the sample stage 1001.

A part of the first reference laser beam $F_1$ is also reflected from the sample surface with atmosphere, which may be the level of water above a sample of cells, resulting in a second or further reflected reference laser beam $F_3$. The reflected reference laser beam $F_3$ is radially displaced within the objective with respect to the ingoing first reference laser beam $F_1$ with a radial distance $R_2$. The beam positions of first reference laser beam $F_1$ and reflected reference laser beam $F_3$ and thus the distance $R_2$ between are detected by the array detector of the photodetector 2006 as shown in more detail with reference to FIGS. 14 and 15A and 15B. The distance $R_2$ between the reference beams is a function of distance $\Delta Z_2$ and so is used to measure the distance of the objective lens 1020 to the sample surface 1010 with the atmosphere.

A second reference laser beam $F_2$ from a second reference laser of the FDU (laser #2) is directed in and out of the objective, along the optical axis 1008, i.e. perpendicular to the objective. The second reference laser beam $F_2$ is directed to the objective via a beam splitter, which forms part of an interferometer (described below with reference to FIGS. 14, 15A and 15B and 16). The first and second reference lasers of the FDU may be applied simultaneously (no time delay) or sequentially (i.e. with a time delay) to each other. The first and second reference lasers of the FDU may be applied simultaneously or sequentially to the timing of the ablation laser pulse(s), preferably simultaneously with the ablation laser pulse(s). In other words, the measurement of $\Delta Z_1$ and/or $\Delta Z_2$ and/or $\Delta Z_3$ can occur simultaneously with or sequentially to the timing of the ablation laser pulse(s) (preferably simultaneously). The measurement of $\Delta Z_1$ and/or $\Delta Z_2$ and/or $\Delta Z_3$ preferably can start before the ablation laser pulse(s) and preferably continue simultaneously. The measurement of $\Delta Z_1$ and/or $\Delta Z_2$ and/or $\Delta Z_3$ can be performed substantially continuously over the time period that includes the ablation laser pulses(s).

Figure 14:
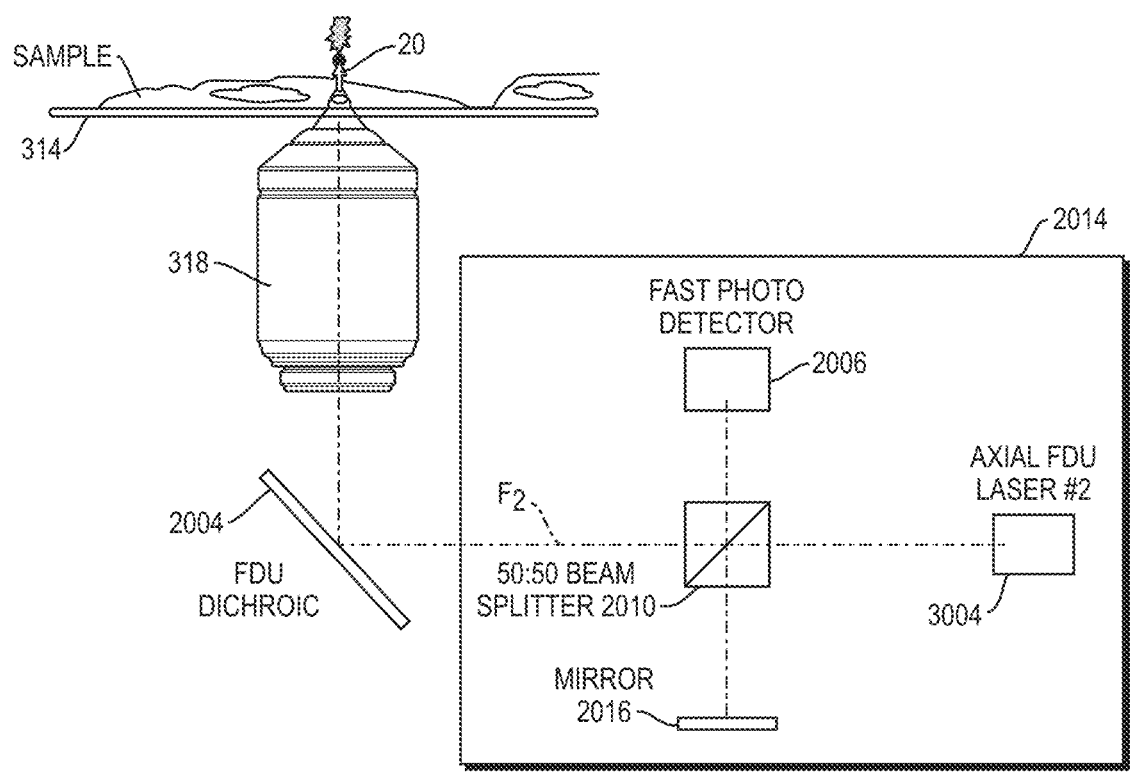
FIG. 14 illustrates further detail of an exemplary optical system incorporating a laser focus detection unit, which includes an interferometer.
Figure 15A:
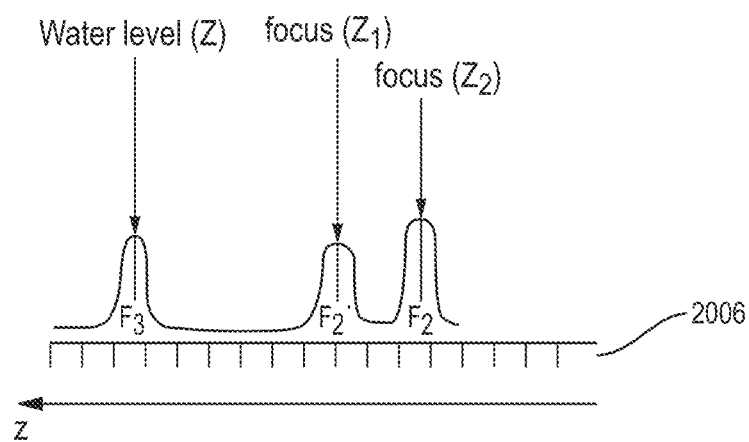
FIG. 15A illustrates the positions of reference laser beams received at an array detector of a laser focus detection unit.

FIG. 15A, shows the positions of the reference laser beams $F_2$, $F_2'$ and $F_3$ as received at the array detector 2006. Reference laser beam $F_1$ is not shown for simplicity. The position of the reference beams $F_2'$ and $F_3$, relative to the beam $F_1$, on the array detector is a measure of the z axis position of the sample stage and sample surface respectively, relative to the objective. The reference beams arrive at the array detector 2006 via a beamsplitter 2010 as shown in FIG. 14. The beamsplitter 2010 is a 50:50 beamsplitter. In other embodiments, a beamsplitter that splits the light in a different ratio, e.g. 10:90 (transmitted:reflected), may be used. In FIG. 14 only the second reference beam $F_2$ is shown for simplicity.

Figure 15B:
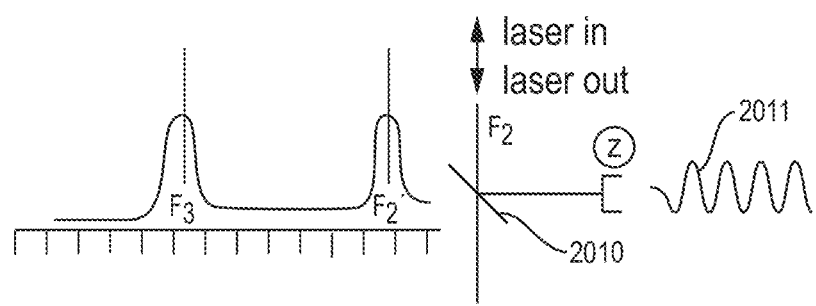
FIG. 15B illustrates one of the beams passing being reflected by a beam splitter and detected by a fast photodetector.
Figure 16:
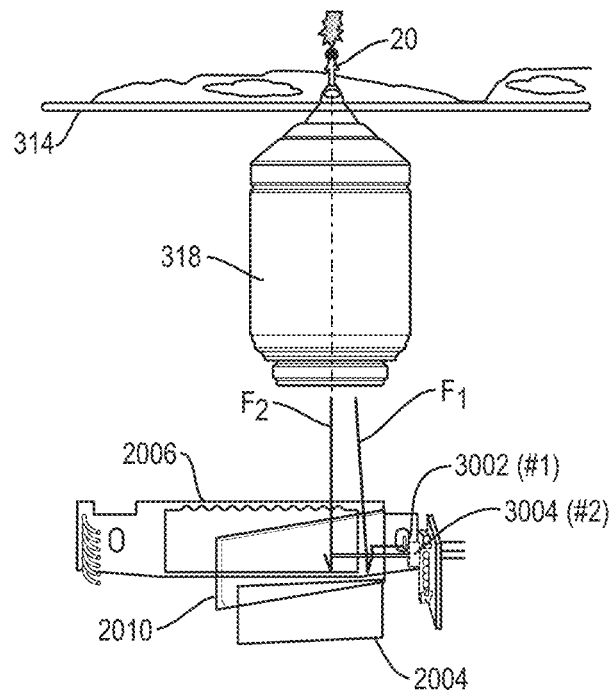
FIG. 16 illustrates a further exemplary optical system incorporating a laser focus detection unit.

The array detector of photodetector 2006 is a photodetector having real time peak detection, i.e. that operates with at least a kHz frame rate (>1 kHz). The time resolution of the array detector is preferably 1 ms or higher, or 1 μs or higher, for example in the range 1 ms to 1 ps, or 1 ms to 1 ns, or 1 ms to 1 μs, or 1 μs to 1 ns. In one embodiment, the photodetector of the FDU comprises an array detector as described and one or more single element photodetectors. Single element photodetectors are used to achieve the highest possible time resolution, e.g. 1 ns or higher or 1 ps or higher. In one embodiment, at least the beam $F_2$ that travels into and out of the objective along the central optical axis is detected by a (single element) detector, or pixel of the array, having a higher time resolution than the array detector, e.g. a time resolution of at least 10 ns, or at least 1 ns, or at least 1 ps, for example 1 ns to 1 ps resolution. FIG. 15B shows schematically the beam $F_2$ passing through and then being reflected by the beamsplitter 2010 to be detected by a single element fast photodetector Z. The interference pattern 2011 resulting from this detection of the reflected $F_2$ beam is also shown. This enables real-time detection of the sample surface, for example the water level.

As shown schematically in FIG. 14, the detector 2006 forms part of an interferometer 2014, which also includes the beamsplitter 2010 and mirror 2016, together with light sources in the form of first reference laser (#1) 3002 and second reference laser (#2) 3004 of the FDU (only laser #2 being shown for simplicity). A further view of the FDU is illustrated schematically in FIG. 16, which again shows the array detector 2006, beamsplitter 2010, dichroic 2004, together with the first reference laser (#1) 3002 and second reference laser (#2) 3004.

Figure 17:
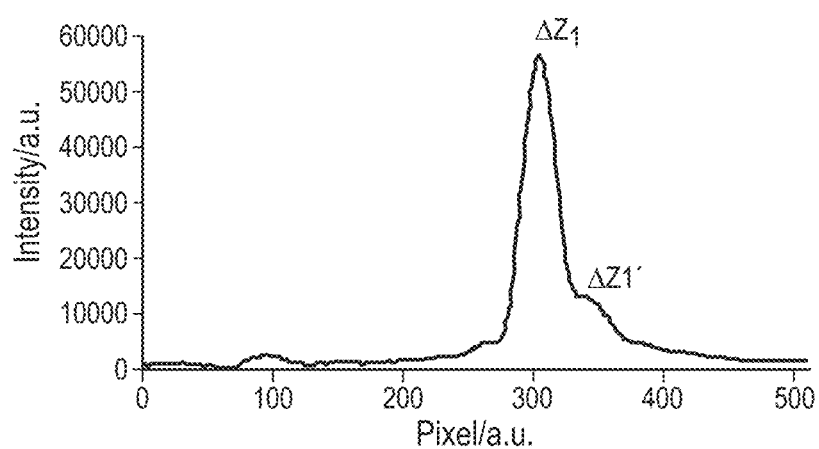
FIG. 17 illustrates exemplary data for pixel intensities on an array detector from laser beams reflected from the sample stage lower surface ($\Delta Z_1$) and upper surface ($\Delta Z_1'$).
Figure 18:
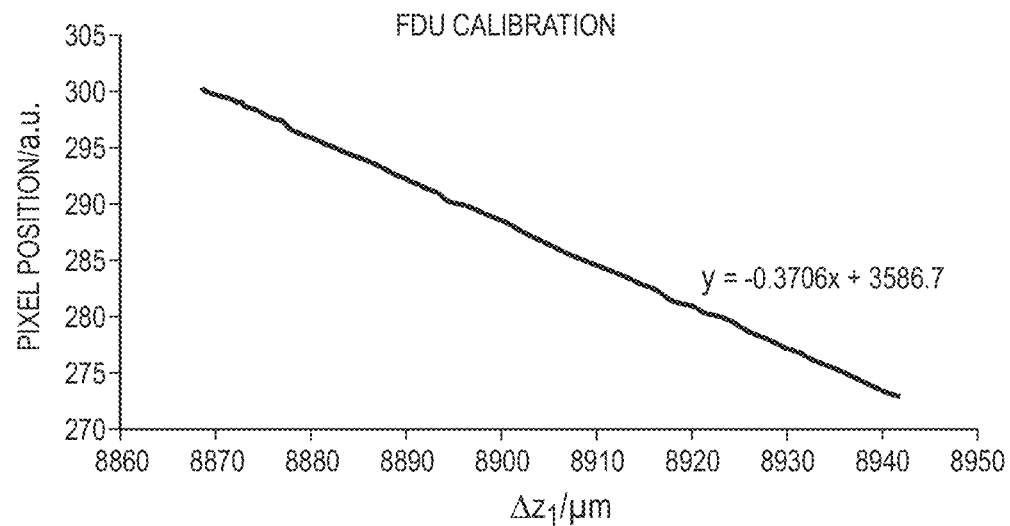
FIG. 18 illustrates a calibration of detection pixels of an array detector for known objective positions.

As described, reference laser #1 is used for triangulation measurements to ascertain the distances $\Delta Z_1$ and $\Delta Z_2$ in the system. In FIG. 17, is shown data for the pixel intensities on the array detector due to the beams reflected from the sample stage (e.g. slide or cover slip) surfaces $\Delta Z_1$ (lower surface) and $\Delta Z_1'$ (upper stage surface). Typically, $\Delta Z_1$ measurement is used for adjustment or control of the z-drive mechanism that positions the objective relative to the sample stage, which provides control of the depth of the laser focus for the ablation laser. The pixel distance of $\Delta Z_{1,1'}$ is a function of the magnification and NA of the objective lens used. The detection pixels of the array detector can be calibrated for known objective positions ($\Delta Z_1$ values, as well as $\Delta Z_2$ values) as shown in FIG. 18. The calibration provides a linear correlation between the pixels of the array detector and the $\Delta Z_1$ values.

Figure 19:
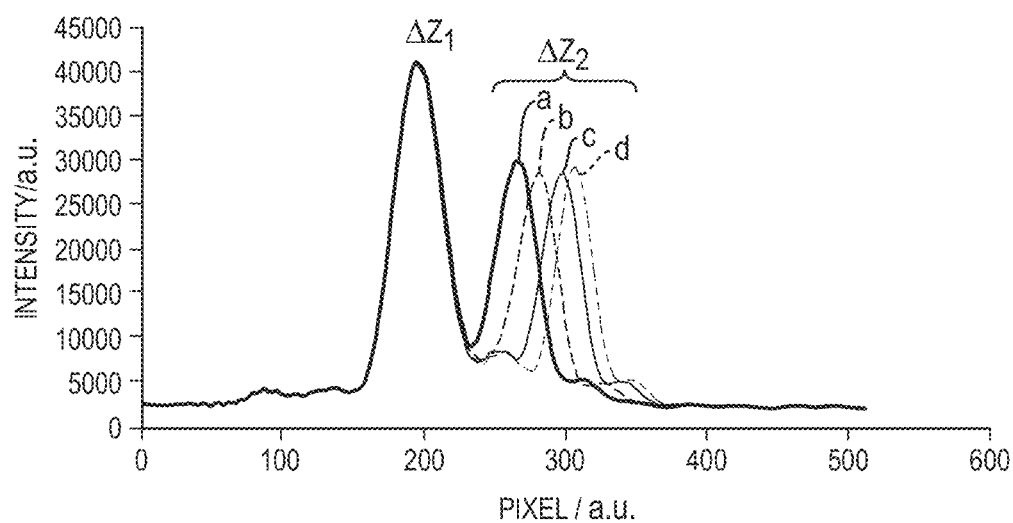
FIG. 19 illustrates exemplary data for pixel intensities on an array detector due to reflected beams from the sample stage ($\Delta Z_1$) and from the sample surface ($\Delta Z_2$) for different water levels or sample heights a, b, c, d.
Figure 20:
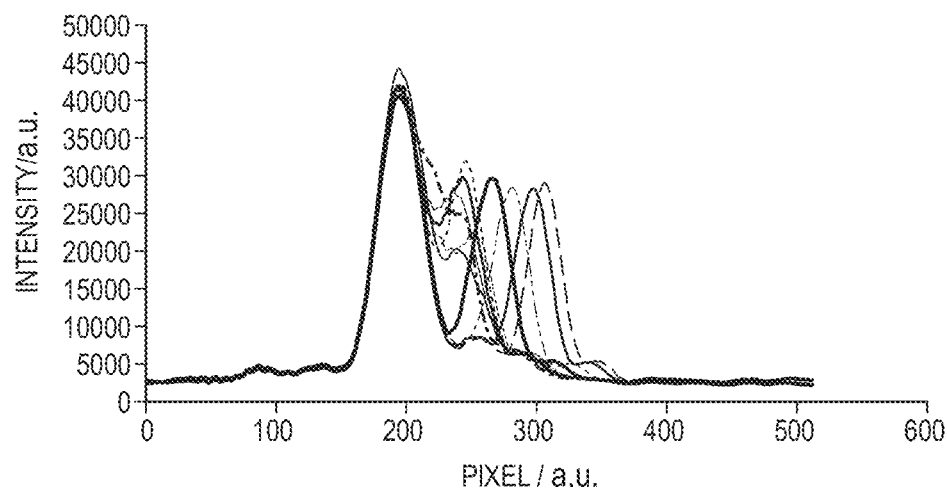
FIG. 20 illustrates the data of FIG. 19 together with additional exemplary data for pixel intensities on the array detector as the sample dries out on the sample stage.

As described, reference laser #1 is also used for triangulation measurements to ascertain the distance $\Delta Z_2$ in the system, e.g. with sub-micrometer precision depending on the type of objective lens in use. In FIG. 19, is shown data for the pixel intensities on the array detector due to the beams reflected from the sample stage ($\Delta Z_1$) and also from the sample surface ($\Delta Z_2$) for different water levels (i.e. sample heights) a, b, c, d. In FIG. 20 is shown the same data but additionally with data from the detector as the sample dries out on the sample stage. The $\Delta Z_2$ value is also used for adjustment or control of the z-drive mechanism that positions the objective relative to the sample surface, which provides control of the depth of the laser focus for the ablation laser.

Figure 21:
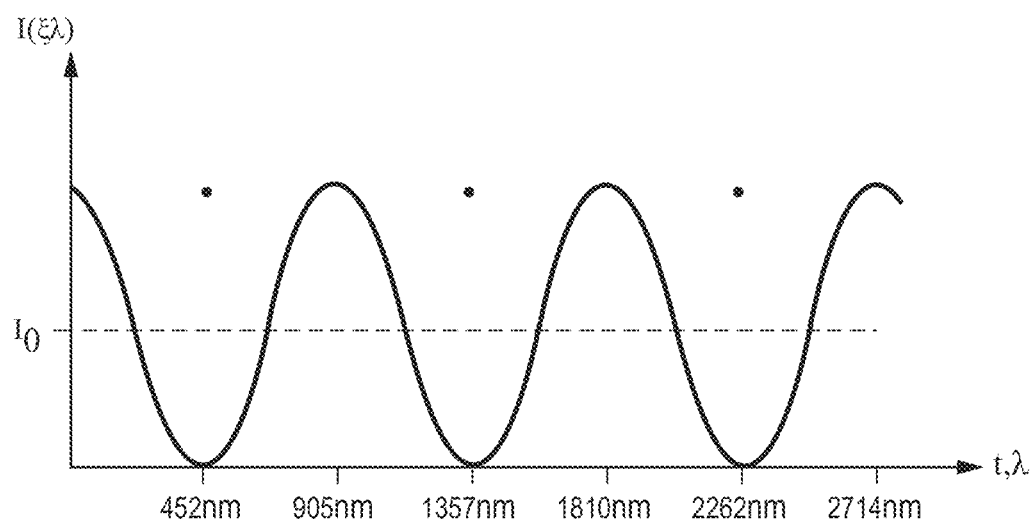
FIG. 21 illustrates the time (t) dependence of an interference signal (I) from a reference laser at the photodetector of the laser focus detection unit derived from reflection of the laser light from a cavity formation and plume-sample interface.

Reference laser #2 (beam $F_2$) of the FDU is used for interferometric measurement of the ablation cavity and plume propagation, i.e. in the z axis direction. FIG. 21 shows the time (t) dependence of the interference signal (I) from laser #2 at the photodetector that derives from reflection from the cavity formation and plume-sample interface. The interference signal provides precise position and time resolved information on the cavity and plume formation. Constructive and destructive extrema in the signal define trajectory coordinates, from the function $X(t, n\cdot \lambda/2)\cdot \Delta X(t)/\Delta t$), which allows to monitor the velocity of the cavity towards the receiver precisely. The extrema occur at $n*\lambda/2$ (n is an integer) and, since the direction of the plume movement is known, with data points every $\lambda/2$, detecting the extrema X at time t, $\Delta X(t)/\Delta t$ is the velocity.

It can be seen from the embodiments described that the FDU can comprise at least a first reference laser configured to direct first laser light to the objective along an axis offset from the optical axis of the objective and the at least one photodetector is configured to detect first laser light reflected back through the objective along an axis offset from the optical axis of the objective. It can further be seen from the embodiments described that the FDU can comprise at least a second reference laser configured to direct second laser light to the objective along the optical axis of the objective and the at least one photodetector is configured to detect the second laser light reflected back through the objective along the optical axis of the objective. Furthermore, in one embodiment, the at least one photodetector configured to detect second laser light reflected back along the optical axis of the objective forms part of an interferometer. In one embodiment, the second laser light reflected back along the optical axis of the objective provides an interference signal from a cavity formed in the sample by the laser light from the ablation laser simultaneously. In one embodiment, the second laser light reflected back along the optical axis of the objective provides an interference signal from a cavity formed in the sample by the laser light from the ablation laser simultaneously.

Referring again to FIG. 12, light B" is the transmitted reference laser beam of the FDU. The fast photodetector 1012, positioned above the sample, at the angle α corresponding to the NA of the objective, monitors the cavity passing the surface of the sample. As the cavity propagates to the surface, the cavity will disturb the transmitted reference laser beam B", and therefore the signal on photodetector 1012 will also change, thereby providing information on the dynamics of cavity formation and cavity travel to the sample surface. This monitoring of the ablation cavity and plume propagation may be in addition to, or alternative to, using reference laser #2 to monitor $\Delta Z_2$.

Figure 22:
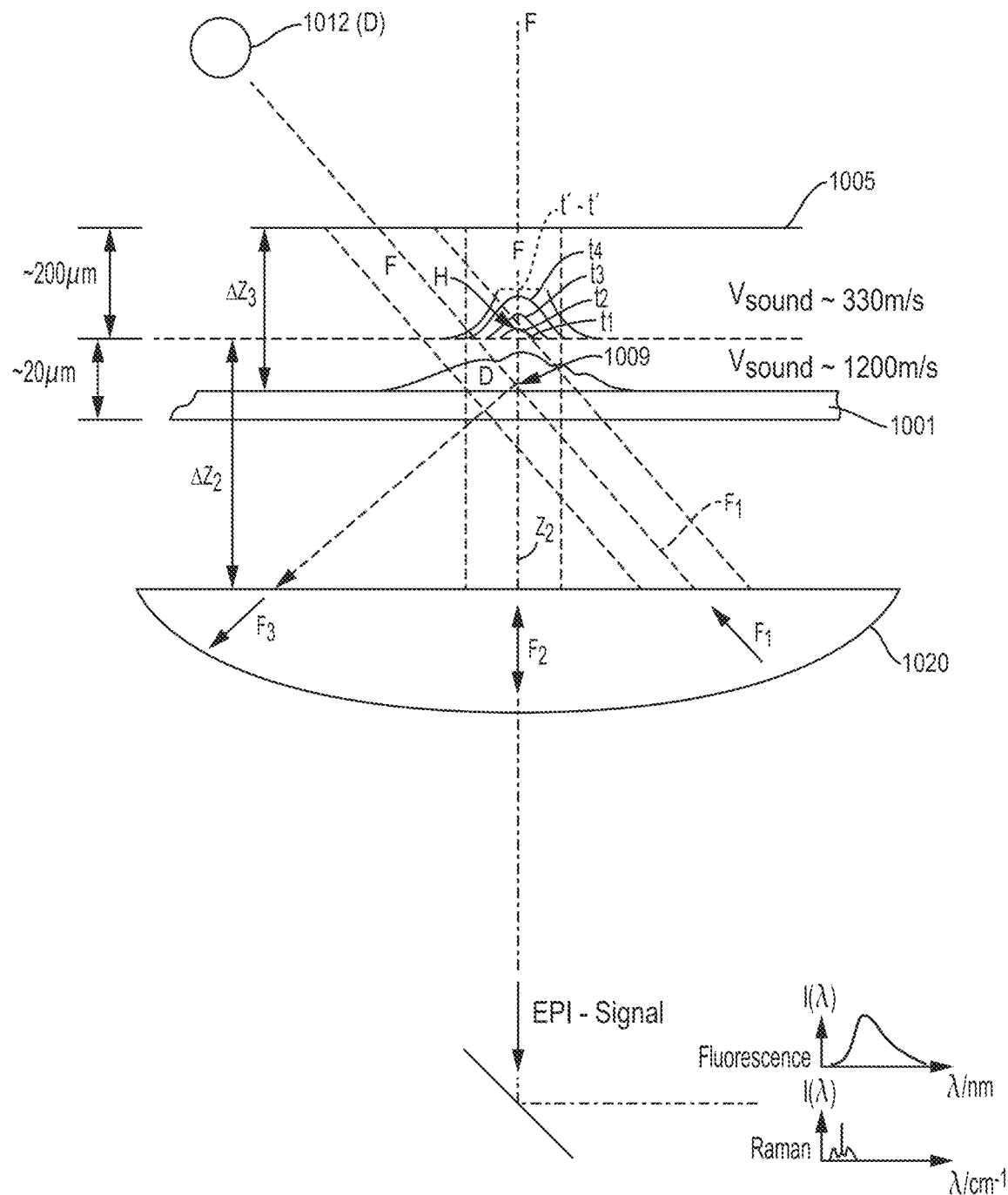
FIG. 22 illustrates schematically an operation of optics for ablation monitoring.

The detection of the dynamics of the ablation cavity and plume formation is performed via fast photodetectors (sub-nanosecond (ns) resolution) to monitor the surface reflection characteristics of the sample, i.e. sample height as a function of time, H(t). Monitoring of detection signal $D(H_t)$ using detector 1012 indicates when the cavity passes the surface of the sample/atmosphere, at time t'. From, time t' to t" the plume is passing the surface. The axial length of the cavity/ plume is defined via $\Delta t = t'' - t'$ and the speed of sound, which is influenced by both the sample medium and atmosphere at this point and can be estimated. FIG. 22 illustrates schematically an operation of the optics for ablation monitoring. The height of the sample surface H is shown developing with the cavity propagation over time, $t_1 < t_2 < t_3 < t_4$, up to the plume formation at $t''$. Monitoring the cavity propagation and plume formation using the reference laser beams $F_1$, $F_2$ and $F_3$ of the FDU is shown, as described above.

It can be seen from the foregoing that in some embodiments, at least one photodetector includes a fast photodetector configured to detect laser light from the at least one reference laser that has been reflected from and/or transmitted through at least one surface of the sample stage and/or sample. A fast photodetector herein preferably has a sub-ns time resolution, i.e. resolution of at least 1 ns, e.g. 1 ns-1 ps. Furthermore, in some embodiments, the at least one fast photodetector includes a photodetector configured to detect laser light from the at least one reference laser that has originated from the (axial) interfaces of the sample with different refractive indices, e.g. been reflected from a surface of the sample stage, and directed back through the objective. The at least one photodetector can include a photodetector configured to detect laser light from the at least one reference laser that has been reflected from a surface of the sample with the atmosphere, facing the receiver, and directed back through the objective. The photodetector can include an array detector for peak detection. In one embodiment, the at least one photodetector includes a photodetector that is disposed on the first (upper) side of the sample and is configured to detect laser light from the at least one reference laser that has been transmitted through the sample. The at least one fast photodetector is preferably configured to resolve the at least one detection signal with sub-nanosecond time resolution. The at least one fast photodetector is preferably at least one photodiode.

Pulsed trans-illumination of the sample from the light source 1011, especially configured as a flash lamp, and detection of the trans-illumination by the camera (e.g. CCD detector 352 in FIGS. 4 and 13), enables snap shot imaging of the dynamics of the cavity formation, cavity travel to the surface medium, and plume formation. The trans-illumination image also enables cavity size determination.

Fluorescence emission, such as epifluorescence, and/or Raman emission can also be measured using the imaging/ablation device. Light from a fluorescence excitation source (e.g. light source 356, FIG. 4 or 13) may be applied, e.g. with or without a delay after the ablation laser. At delay $t=0$ (i.e. no delay with respect to the ablation laser), it is possible to use the non-linear effect of the ablation laser for fluorescence, for example as described in: https://www.ncbi.nlm.nih.gov/pmc/articles/PMC6788598 (Lee et al, Simultaneous label-free autofluorescence and multi-harmonic imaging reveals in vivo structural and metabolic changes in murine skin, Biomed Opt Express. 2019, 10(10), 5431-5444; https://www.nature.com/articles/s41467-018-04470-8 (You et al, Intravital imaging by simultaneous label-free autofluorescence-multiharmonic microscopy, *Nature Communications* 9, Article number: 2125 (2018); and https://aip.scitation.org/doi/full/10.1063/1.5098349 (S. A. Boppart et al, Simultaneous label-free autofluorescence-multiharmonic microscopy and beyond. For Raman emission, a separate excitation laser can be employed (not shown). The emission can be spectrally and/or time resolved. Such emission can be obtained as a signal from the focus of the ablation laser and, for example, from a snapshot image. The same detector, such as the camera used to detect trans-illumination, can be used to detect a fluorescence emission image. However, preferably the fluorescence emission or Raman emission (at least Raman), is guided to a fast photodetector (e.g. an array photodetector) with a spectrometer to enable time-resolved and spectrally-resolved detection of fluorescence or Raman emission of the ablation volume of the sample. Using such system, cavity formation in the sample may be imaged with trans-illumination using the flash light 1011 at a time t after the ablation laser pulse(s) and fluorescence may be imaged after the excitation of material at a later time $t'$. Time resolution can thus also be obtained from use of the different light sources of trans-illumination and fluorescence. Referring to FIG. 22, the epi-signal (epifluorescence and/or Raman signal) from the laser focus 1009 is directed by splitter to a fast photodetector (e.g. an array photodetector) combined with a spectrometer to enable time-resolved and spectrally-resolved detection of the fluorescence spectrum or Raman spectrum, e.g. $I(\lambda)$.

The detected epi-fluorescence signal or image is preferably time-resolved and may be used to provide cavity characteristics and information about molecular fragmentation in the sample, i.e. at the focal position of the objective lens. Detection of fluorescence depletion can indicate molecular fragmentation is occurring, e.g. if the ablation laser pulse energy is too high. In one embodiment, the next ablation laser pulse is then applied with lower energy. Quantitative fluorescence intensity analysis enables to estimate transfer efficiency of ablated material to the analyser, e.g. mass spectrometer. Analysis of vibrational/rotational bands of the Raman signal on the other hand reveals information on the expected masses of the molecules sent to the analyser (e.g. mass spectrometer), whilst the intensity distribution of the vibrational/rotational bands indicates the thermal state (internal energy) of the molecules. Raman peak intensity can be correlated with the peak intensity of the molecules detected by the mass spectrometer.

Figure 23A:
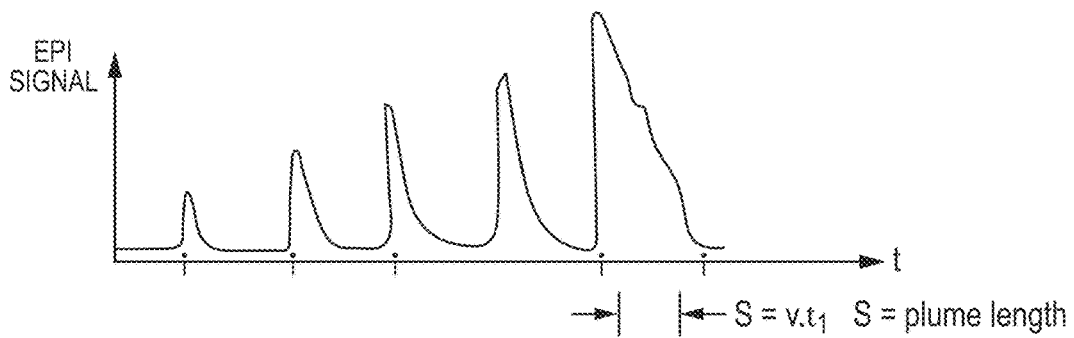
FIGS. 23A-D illustrates effects of calibration or control of ablation parameters in real time (t): (i) the pulse energy $E_0$ per pulse, (ii) expansion of the cavity, (iii) the position of the transition from sample medium to atmosphere, (iv) the epifluorescence signal.
Figure 23B:
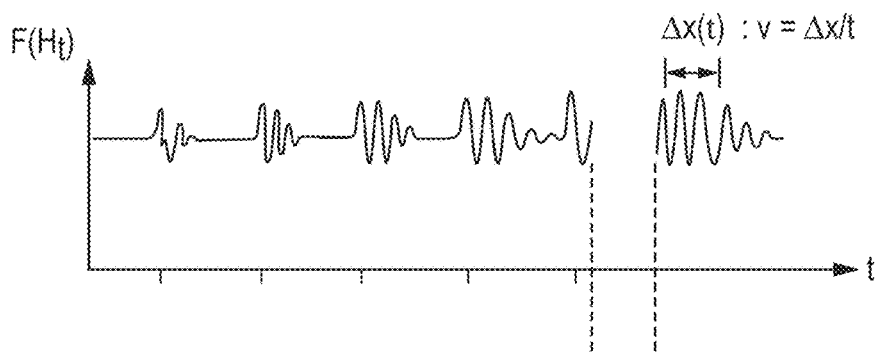
Figure 23C:
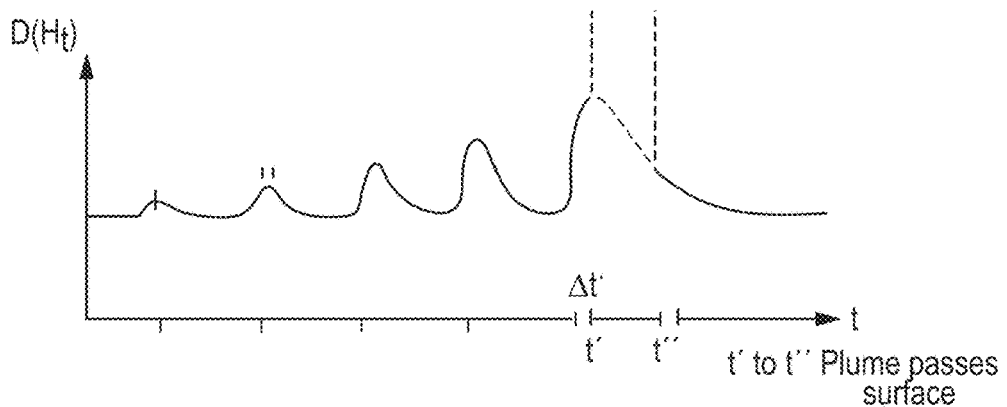
Figure 23D:
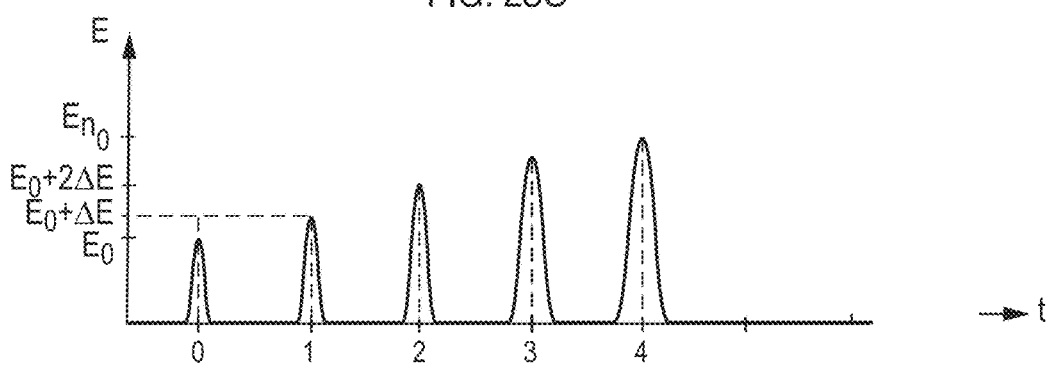

FIGS. 23A-D show how calibration of the ablation parameter, ablation laser pulse energy $E_0$, can be performed. The pulse energy $E_0$ and the sample height from the objective $\Delta Z_2$ determine if the cavity can pass the sample/atmosphere interface and form an ablation plume. At a threshold pulse energy $E_{max}$ ablated molecules denature, i.e. fragment, which is detected as fluorescence depletion. Thus, the pulse energy E $\Delta Z2$ needs to be lowered, if effective pulse energy $E_0 > E_{max}$. The value $\Delta z2$ can be lowered due to evaporation. However, this make take time. Optionally, or additionally, $\Delta z3$ lowering may be used due to cos 2 divergence of the plume concentration. The change of signal D on detector 1012 is a function H(t). In one embodiment, as shown in FIG. 23A, the pulse energy $E_0$ per pulse and/or pulse frequency is increased until detection signal D (H(t)), as shown in FIG. 23B, indicates expansion of the cavity at time $t'$. The time $t'$ is a function of the speed of sound, and of $\Delta Z_3$. From $t'-t''$, the axial height of the plume passing the interface medium/air can be found. As shown in FIG. 23C, the reference beam $F_3(H_t)$ measures the precise position of the transition (interface) from medium to atmosphere and the particles in atmosphere propagating towards the receiver, which can be for example an ionization module of the mass spectrometer. The (time) resolved epifluorescence signal shown in FIG. 23D provides information on the cavity characteristics and molecule fragmentation at the focal position of the objective lens.

It can be seen from the foregoing that, in embodiments, the optical assembly includes a laser focus detection unit, the laser focus detection unit including: at least one reference laser, the at least one reference laser being disposed on the second side of the sample stage and being configured to direct laser light through the objective, through the sample stage and into the sample, the laser focus detection unit further including at least one photodetector, the at least one photodetector being configured to generate at least one detection signal by detecting laser light from the at least one reference laser, which is indicative of one or more characteristics of the sample while at least a portion of it is being ablated and/or indicative of a distance from the objective to the sample stage and/or indicative of a distance from the objective to a surface of the sample.

In embodiments, the laser focus detection unit is further configured to send the at least one detection signal to a controller, the controller being configured to dynamically control one or more parameters of the ablation laser and/or a position of the objective and/or a position of the receiver based on the at least one detection signal. The controller may be the controller 140 or the controller 2050 described above, or a similar controller. In general, the controller comprises a microcontroller and FPGA or computer system and is communicatively coupled to one or more of the other components of the system to provide control and/or feedback of the system as described further below. The controller is communicatively coupled to the laser focus detection unit to receive the one or more detection signals. In one embodiment, the controller is communicatively coupled to the objective (e.g. via a drive to control the objective position in the z axial directions). In one embodiment, the controller is also communicatively coupled to the receiver stage (e.g. via a drive to control the receiver position in the x, y and/or z axial directions). In one embodiment, the controller is also communicatively coupled to the ablation laser (e.g. to control the laser pulse energy and/or pulse frequency).

The controller may include one or more processors, memory (e.g., on one or more hardware storage devices), and a communications module for controlling the sending and receiving of data between the controller and the various components of the system to which the controller is coupled. The controller may also include input/output hardware as known in the art for receiving input from a user and/or for displaying information to a user.

The device and system described can be used to provide a means of continuous or real-time adjustment or control of the ablation process, in particular the laser pulse energy, pulse frequency and/or laser focus position in the sample. In one embodiment, the controller is configured to dynamically control one or more parameters of the ablation laser and/or a position of the objective and/or a position of the receiver based on the at least one detection signal from the FDU. In one embodiment, the controller is configured to continuously adjust a position of the objective and/or a position of the receiver based on the at least one detection signal. Thus, the at least one detection signal from the FDU forms the basis of a control loop for continuous, real-time control of the ablation process.

In one embodiment, based on $\Delta Z_1$ (and $\Delta Z2$) measured by the FDU, the axial (z) distance between the objective and sample stage is continuously, i.e. with high frequency and in real-time, adjusted as the laser focus within the sample is moved. Adjustment of the axial position of the objective may be achieved by via a moveable drive/actuator controlled by the controller responsive to the feedback on $\Delta Z1$ (and $\Delta Z2$). Based on $\Delta Z_1$ and $\Delta Z_2$, the distance between the laser focus and the receiver or between the sample surface and the receiver is continuously corrected. Adjustment of the axial position of the receiver may be achieved by via a moveable receiver stage controlled by the controller responsive to the feedback on $\Delta Z1$ and $\Delta Z2$.

In one embodiment, the detection signal from the fast photodetector detecting the transmitted reference beam B", and/or the detection signal from the fast photodetector detecting the reference beam $F_2$ along the optical axis of the objective is preferably used to control the number of pulses in the pulse train (pulse frequency) of the ablation laser in order to ensure the laser-induced cavity is fed through the sample medium. The number of pulses and the pulse intensity can each be control loop parameters. The interference in the detection signal from the fast photodetector detecting the reference beam $F_2$ is used to monitor the relative travel of the cavity in the axial (z) direction.

In one embodiment, the detection signal (D) from the fast photodetector detecting the transmitted reference beam B" is preferably used to control the pulse energy of the ablation laser. Furthermore, the fluorescence/Raman signal can also or alternatively allow monitoring and control of fragmentation of molecules in the sample by controlling the laser power accordingly.

In one embodiment, snap shot epifluorescence imaging allows to interpret plume formation and heat detection. In this way, the ablated region of interest (ROI), laser power, and/or pulse train characteristics can be adapted accordingly.

In one embodiment, the controller is communicatively coupled to a mass spectrometer that analyses the ablated portion of the sample, such that one or more of the control parameters of the system controlled by the controller are linked to the mass spectrometer signal. Correlation of the observables of the FDU with the MS signal enables qualitative correction of the mass spectrometer response. Snap shot imaging of the mass spectrometer signal enables keeping the mass spectrometer signal constant for the MS detection.

Figure 24:
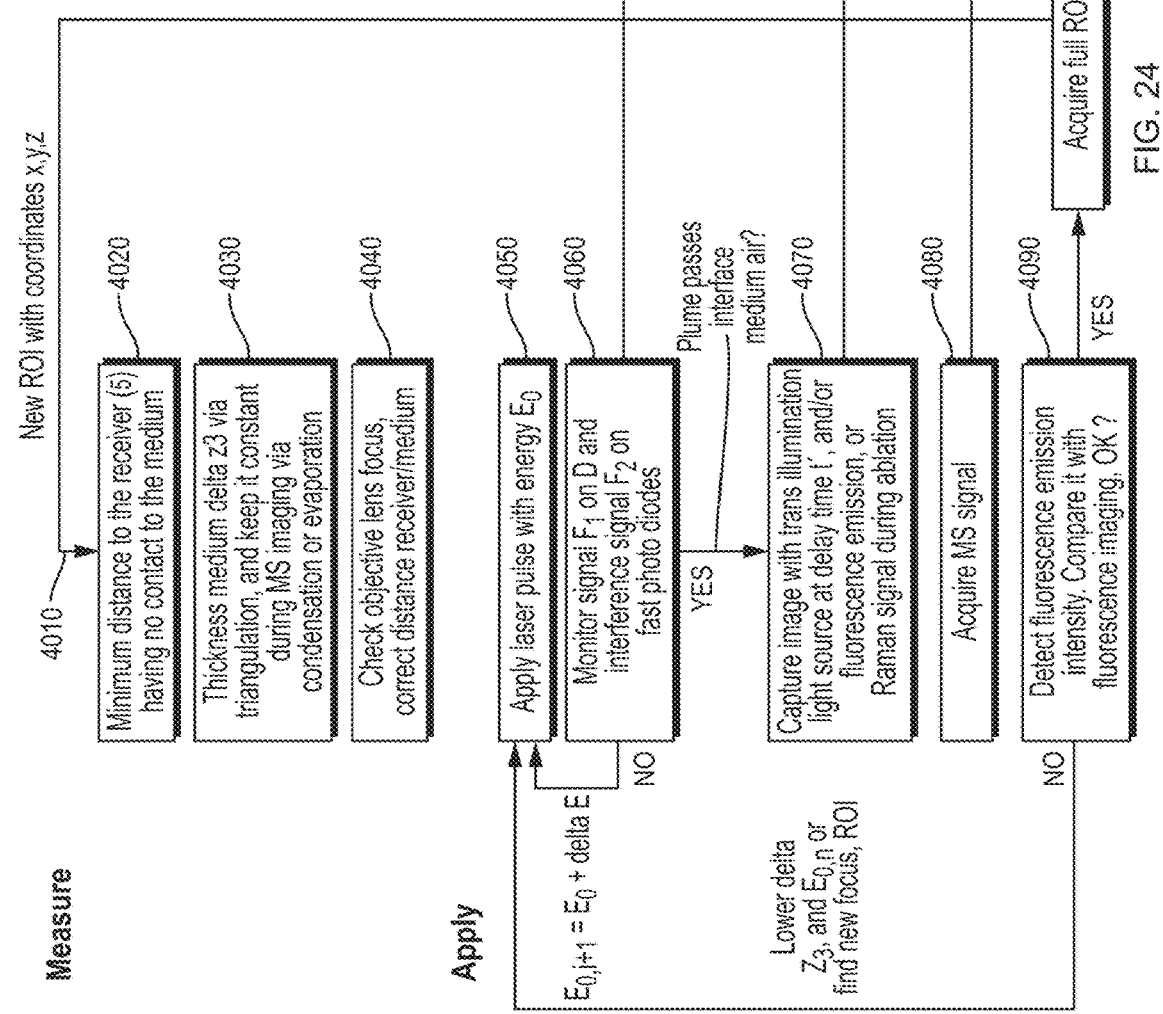
FIG. 24 illustrates a flow diagram for a process for real-time optimization of control parameters of the imaging/ablation device.

Referring to FIG. 24, there is shown a flow diagram of a process for real-time optimization of control parameters of the imaging/ablation device.

Using the imaging capability as described, a region of interest ROI in the sample positioned on the sample stage with x,y,z coordinates is selected at step 4010. A minimum distance from the sample stage to the receiver is set at step 4020 by the device that ensures no contact between the receiver and sample. At step 4030, using the described methods of triangulation using the Focus Detection Unit (FDU) for $\Delta Z_1$, $\Delta Z_2$, $\Delta Z_3$, the thickness of the sample medium above the sample stage can be measured and by feedback in the loop with the controller the distance from the sample medium to the receiver can be maintained constant during the mass spectrometer measurement, for example to compensate any condensation or evaporation affecting the sample. At step 4040, the objective lens focus position is continuously corrected, along with the distance from the sample medium to the receiver. The ablation laser pulse is applied at step 4050 with energy $E_0$. The signal of the transmitted reference FDU laser beam $F_1$ (B") at the fast photodetector is then monitored along with the interference signal of the reflected FDU laser beam $F_2$ at step 4060. From these signals it is determined whether or not the ablation plume has passed the interface of the sample with the atmosphere. If 'No', then the step 4050 is repeated with an ablation laser pulse energy adjusted to $E_{0,i+1}=E_0+\Delta E$. If 'Yes', then at step 4070 an image is captured with the trans-illumination light source at delay time t' after the ablation pulse and/or fluorescence emission and/or a Raman signal is measured. Meanwhile, a mass spectrometer measurement of ablated material introduced to the mass spectrometer via the receiver is acquired at step 4080. The fluorescence emission intensity is compared with the imaging at step 4090 to check whether the degree of fragmentation of the molecules in the sample by the laser pulse is an acceptable level. If 'No', then $\Delta Z_3$ and laser pulse energy $E_0$ are lowered, or a new focus position and/or ROI is selected. If 'Yes', then mass spectrometer measurements of ablated sample material are acquired for the full ROI at step 4100. The data from steps 4060, 4070, 4080 and 4100 provide at step 4200 for quantitative interpretation of the transmission of molecules from the sample detected with the mass spectrometer, using input parameters such as cavity volume, and fluorescence signal.

Computer/Controller Systems

It will be appreciated that computer systems are increasingly taking a wide variety of forms. In this description and in the claims, the terms "controller," "computer system," or "computing system" are defined broadly as including any device or system—or combination thereof—that includes at least one physical and tangible processor and a physical and tangible memory capable of having thereon computer-executable instructions that may be executed by a processor. By way of example, not limitation, the term "computer system" or "computing system," as used herein is intended to include personal computers, desktop computers, laptop computers, tablets, hand-held devices (e.g., mobile telephones, PDAs, pagers), microprocessor-based or programmable consumer electronics, minicomputers, mainframe computers, multi-processor systems, network PCs, distributed computing systems, datacenters, message processors, routers, switches, and even devices that conventionally have not been considered a computing system, such as wearables (e.g., glasses).

The memory may take any form and may depend on the nature and form of the computing system. The memory can be physical system memory, which includes volatile memory, non-volatile memory, or some combination of the two. The term "memory" may also be used herein to refer to non-volatile mass storage such as physical storage media.

The computing system also has thereon multiple structures often referred to as an "executable component." For instance, the memory of a computing system can include an executable component. The term "executable component" is the name for a structure that is well understood to one of ordinary skill in the art in the field of computing as being a structure that can be software, hardware, or a combination thereof.

For instance, when implemented in software, one of ordinary skill in the art would understand that the structure of an executable component may include software objects, routines, methods, and so forth, that may be executed by one or more processors on the computing system, whether such an executable component exists in the heap of a computing system, or whether the executable component exists on computer-readable storage media. The structure of the executable component exists on a computer-readable medium in such a form that it is operable, when executed by one or more processors of the computing system, to cause the computing system to perform one or more functions, such as the functions and methods described herein. Such a structure may be computer-readable directly by a processor—as is the case if the executable component were binary. Alternatively, the structure may be structured to be interpretable and/or compiled—whether in a single stage or in multiple stages—so as to generate such binary that is directly interpretable by a processor.

The term "executable component" is also well understood by one of ordinary skill as including structures that are implemented exclusively or near-exclusively in hardware logic components, such as within a field programmable gate array (FPGA), an application specific integrated circuit (ASIC), Program-specific Standard Products (ASSPs), System-on-a-chip systems (SOCs), Complex Programmable Logic Devices (CPLDs), or any other specialized circuit. Accordingly, the term "executable component" is a term for a structure that is well understood by those of ordinary skill in the art of computing, whether implemented in software, hardware, or a combination thereof.

The terms "component," "service," "engine," "module," "control," "generator," or the like may also be used in this description. As used in this description and in this case, these terms—whether expressed with or without a modifying clause—are also intended to be synonymous with the term "executable component" and thus also have a structure that is well understood by those of ordinary skill in the art of computing.

While not all computing systems require a user interface, in some embodiments a computing system includes a user interface for use in communicating information from/to a user. The user interface may include output mechanisms as well as input mechanisms. The principles described herein are not limited to the precise output mechanisms or input mechanisms as such will depend on the nature of the device. However, output mechanisms might include, for instance, speakers, displays, tactile output, projections, holograms, and so forth. Examples of input mechanisms might include, for instance, microphones, touchscreens, projections, holograms, cameras, keyboards, stylus, mouse, or other pointer input, sensors of any type, and so forth.

Accordingly, embodiments described herein may comprise or utilize a special purpose or general-purpose computing system. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example—not limitation—embodiments disclosed or envisioned herein can comprise at least two distinctly different kinds of computer-readable media: storage media and transmission media.

Computer-readable storage media include RAM, ROM, EEPROM, solid state drives ("SSDs"), flash memory, phase-change memory ("PCM"), CD-ROM or other optical disk storage, magnetic disk storage or other magnetic storage devices, or any other physical and tangible storage medium that can be used to store desired program code in the form of computer-executable instructions or data structures and that can be accessed and executed by a general purpose or special purpose computing system to implement the disclosed functionality of the invention. For example, computer-executable instructions may be embodied on one or more computer-readable storage media to form a computer program product.

Transmission media can include a network and/or data links that can be used to carry desired program code in the form of computer-executable instructions or data structures and that can be accessed and executed by a general purpose or special purpose computing system. Combinations of the above should also be included within the scope of computer-readable media.

Further, upon reaching various computing system components, program code in the form of computer-executable instructions or data structures can be transferred automatically from transmission media to storage media (or vice versa). For example, computer-executable instructions or data structures received over a network or data link can be buffered in RAM within a network interface module (e.g., a "NIC") and then eventually transferred to computing system RAM and/or to less volatile storage media at a computing system. Thus, it should be understood that storage media can be included in computing system components that also—or even primarily—utilize transmission media.

Those skilled in the art will further appreciate that a computing system may also contain communication channels that allow the computing system to communicate with other computing systems over, for example, a network. Accordingly, the methods described herein may be practiced in network computing environments with many types of computing systems and computing system configurations. The disclosed methods may also be practiced in distributed system environments where local and/or remote computing systems, which are linked through a network (either by hardwired data links, wireless data links, or by a combination of hardwired and wireless data links), both perform tasks. In a distributed system environment, the processing, memory, and/or storage capability may be distributed as well.

Those skilled in the art will also appreciate that the disclosed methods may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Abbreviated List of Defined Terms

To assist in understanding the scope and content of this written description and the appended claims, a select few terms are defined directly below. Unless defined otherwise, all technical and scientific terms used herein have the same meaning as commonly understood by one of ordinary skill in the art to which the present disclosure pertains.

The terms "approximately," "about," and "substantially," as used herein, represent an amount or condition close to the specific stated amount or condition that still performs a desired function or achieves a desired result. For example, the terms "approximately," "about," and "substantially" may refer to an amount or condition that deviates by less than 10%, or by less than 5%, or by less than 1%, or by less than 0.1%, or by less than 0.01% from a specifically stated amount or condition.

As used herein, the term "ablation" refers to selective application of energy to a targeted region in order to free biomolecules within the targeted region from surrounding structures. The ablated materials will typically form a "plume" of material that travels away from the initial position of the targeted region.

The term "region of interest," as used herein, is intended to be understood as any region within a field of view of an imaging/ablating device where one or more biomolecules reside that are desired to be collected, processed, and/or analyzed. The region of interest may include the entire field of view, but more typically will be a portion of the field of view and may be, for example, a cell or collection of cells, an intra/sub-cellular region such as an organelle within a cell, or an extracellular region.

The term "subsample" as used herein, is intended to refer to the individual portions of ablated material that are spatially and/or temporally separate from one another, such as by being spatially separated from one another on the receiver and/or by being received by the receiver at different times from different ablation events. The term subsample is therefore intended to distinguish the separate portions of collected ablated material from the larger, overall "sample" which is positioned on the slide/stage that may be imaged and selectively ablated.

Various aspects of the present disclosure, including devices, systems, and methods may be illustrated with reference to one or more embodiments or implementations, which are exemplary in nature. As used herein, the term "exemplary" means "serving as an example, instance, or illustration," and should not necessarily be construed as preferred or advantageous over other embodiments disclosed herein. In addition, reference to an "implementation" of the present disclosure or invention includes a specific reference to one or more embodiments thereof, and vice versa, and is intended to provide illustrative examples without limiting the scope of the invention, which is indicated by the appended claims rather than by the following description.

As used in the specification, a word appearing in the singular encompasses its plural counterpart, and a word appearing in the plural encompasses its singular counterpart, unless implicitly or explicitly understood or stated otherwise. Thus, it will be noted that, as used in this specification and the appended claims, the singular forms "a," "an" and "the" include plural referents unless the context clearly dictates otherwise. For example, reference to a singular referent (e.g., "a widget") includes one, two, or more referents unless implicitly or explicitly understood or stated otherwise. Similarly, reference to a plurality of referents should be interpreted as comprising a single referent and/or a plurality of referents unless the content and/or context clearly dictate otherwise. For example, reference to referents in the plural form (e.g., "widgets") does not necessarily require a plurality of such referents. Instead, it will be appreciated that independent of the inferred number of referents, one or more referents are contemplated herein unless stated otherwise.

As used herein, directional terms, such as "top," "bottom," "left," "right," "up," "down," "upper," "lower," "proximal," "distal," "adjacent," and the like are used herein solely to indicate relative directions and are not otherwise intended to limit the scope of the disclosure and/or claimed invention.

Conclusion

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed in part by preferred embodiments, exemplary embodiments, and optional features, modification and variation of the concepts herein disclosed may be resorted to by those skilled in the art, and such modifications and variations are considered to be within the scope of this invention as defined by the appended claims. The specific embodiments provided herein are examples of useful embodiments of the present invention and various alterations and/or modifications of the inventive features illustrated herein, and additional applications of the principles illustrated herein that would occur to one skilled in the relevant art and having possession of this disclosure, can be made to the illustrated embodiments without departing from the spirit and scope of the invention as defined by the claims and are to be considered within the scope of this disclosure.

It will also be appreciated that systems, devices, products, kits, methods, and/or processes, according to certain embodiments of the present disclosure may include, incorporate, or otherwise comprise properties or features (e.g., components, members, elements, parts, and/or portions) described in other embodiments disclosed and/or described herein. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

All references cited in this application are hereby incorporated in their entireties by reference to the extent that they are not inconsistent with the disclosure in this application. It will be apparent to one of ordinary skill in the art that methods, devices, device elements, materials, procedures, and techniques other than those specifically described herein can be applied to the practice of the invention as broadly disclosed herein without resort to undue experimentation. All art-known functional equivalents of methods, devices, device elements, materials, procedures, and techniques specifically described herein are intended to be encompassed by this invention.

When a group of materials, compositions, components, or compounds is disclosed herein, it is understood that all individual members of those groups and all subgroups thereof are disclosed separately. When a Markush group or other grouping is used herein, all individual members of the group and all combinations and sub-combinations possible of the group are intended to be individually included in the disclosure. Every formulation or combination of components described or exemplified herein can be used to practice the invention, unless otherwise stated. Whenever a range is given in the specification, for example, a temperature range, a time range, or a composition range, all intermediate ranges and subranges, as well as all individual values included in the ranges given are intended to be included in the disclosure.

All changes which come within the meaning and range of equivalency of the claims are to be embraced within their scope.

What is claimed is:

1. A device for imaging and ablating a sample that allows for analysis of an ablated portion of the sample, the device comprising: a sample stage having a first side configured for placement of a sample thereon and a second side disposed opposite the first side; an optical assembly including an objective, the objective being disposed on the second side of the sample stage and being configured to enable microscopic imaging of the sample placed on the sample stage, the optical assembly also including an ablation laser, wherein the ablation laser is disposed on the second side of the sample stage, the ablation laser being configured to direct laser light through the objective, through the sample stage and into the sample to selectively ablate at least a portion of the sample; and a receiver disposed on the first side of the sample stage, the receiver being configured to receive ablated material ejected from the sample to enable further analysis of the ablated material; wherein the optical assembly also includes a laser focus detection unit, the laser focus detection unit including: at least one reference laser, the at least one reference laser being disposed on the second side of the sample stage and being configured to direct laser light through the objective, through the sample stage and into the sample, the laser focus detection unit further including at least one photodetector, the at least one photodetector being configured to generate at least one detection signal by detecting laser light from the at least one reference laser, the at least one detection signal being indicative of one or more characteristics of the sample while at least a portion of it is being ablated and indicative of a distance from the objective to the sample stage and indicative of a distance from the objective to a surface of the sample, or a combination thereof; wherein the laser focus detection unit is further configured to send the at least one detection signal to a controller, the controller being configured to dynamically control in real time one or more parameters of the ablation laser and a position of the objective and a position of the receiver based on the at least one detection signal, or a combination thereof, to provide continuous or real-time adjustment or control of the ablation process.

2. The device of claim 1, wherein the laser focus detection unit is configured to detect laser light from the at least one reference laser with a time resolution of 1-10 nanosecond or less, and send the at least one detection signal to the controller.

3. The device of claim 1, wherein the one or more characteristics of the sample include at least one of: formation of a cavity in the sample caused by the laser light from the ablation laser, formation of an ablation plume resulting from ablated material ejected from the sample, and a change in the thickness of the sample.

4. The device of claim 1, wherein the controller is configured to control one or more parameters of the ablation laser that include a laser pulse energy or a laser pulse frequency, or a combination thereof.

5. The device of claim 1, wherein the controller is configured to continuously adjust a position of the objective or a position of the receiver based on the at least one detection signal, or a combination thereof.

6. The device of claim 1, wherein the at least one photodetector includes a fast photodetector configured to detect laser light from the at least one reference laser that has been reflected from or transmitted through at least one surface of the sample stage or sample.

7. The device of claim 6, wherein the fast photodetector includes a photodetector configured to detect laser light from the at least one reference laser that has been reflected from a surface of the sample stage and directed back through the objective.

8. The device of claim 7, wherein the photodetector includes an array detector for peak detection.

9. The device of claim 6, wherein the at least one photodetector includes a photodetector configured to detect laser light from the at least one reference laser that has been reflected from a surface of the sample facing the receiver and directed back through the objective.

10. The device of claim 6, wherein the at least one photodetector includes a photodetector that is disposed on the first side of the sample and is configured to detect laser light from the at least one reference laser that has been transmitted through the sample.

11. The device of claim 1, wherein at least one photodetector is configured to resolve the at least one detection signal with sub-nanosecond time resolution.

12. The device of claim 1, wherein the at least one reference laser comprises at least a first reference laser configured to direct first laser light to the objective along an axis offset from the optical axis of the objective and the at least one photodetector is configured to detect first laser light reflected back through the objective along an axis offset from the optical axis of the objective.

13. The device of claim 1, wherein the at least one reference laser comprises at least a second reference laser configured to direct second laser light to the objective along an optical axis of the objective and the at least one photodetector is configured to detect second laser light reflected back through the objective along the optical axis of the objective.

14. The device of claim 13, wherein the at least one photodetector configured to detect second laser light reflected back along the optical axis of the objective forms part of an interferometer.

15. The device of claim 14, wherein the second laser light reflected back along the optical axis of the objective provides an interference signal from a cavity formed in the sample by the laser light from the ablation laser simultaneously.

16. The device of claim 1, further comprising a light source disposed on the first side of the sample, the light source being configured for trans-illumination of the sample.

17. The device of claim 1, further comprising a fluorescence excitation source configured for epifluorescence imaging or analysis of the sample, or a combination thereof, the fluorescence excitation source preferably being disposed on the second side of the sample.

18. The device of claim 17, further comprising a spectrometer configured to spectrally resolve or time resolve fluorescence or Raman emission from the sample, or a combination thereof, preferably the spectrometer being disposed on the second side of the sample.

19. The device of claim 1, wherein the ablation laser is a femtosecond laser, preferably a near infrared laser.

20. The device of claim 1, wherein the at least one reference laser is a diode laser, preferably in the form of a photonic integrated circuit.

21. The device of claim 1, wherein the optical assembly is configured to enable ablation of a targeted region having a diameter of about 50 μm or less, or about 30 μm or less, or about 10 μm or less, or about 5 μm or less, or about 3 μm or less, or about 1.5 μm or less, or about 1 μm or less.

22. A system for ablating and analyzing a targeted region of a sample, the system comprising:
the imaging and ablating device as in claim 1; and
an analyzer configured to receive and analyze at least a portion of the ablated material received by the receiver.

23. The system of claim 22, wherein the analyzer comprises one or more of: a PCR machine, a sequencing machine, an optical spectrometer and a mass spectrometer.

24. The system of claim 23, wherein the mass spectrometer is configured as a time of flight (TOF) mass spectrometer, an Orbitrap mass spectrometer, a linear ion trap mass spectrometer, a quadrupole mass spectrometer, a quadrupole ion trap mass spectrometer, a magnetic sector mass spectrometer, or a Fourier transform ion cyclotron resonance (FTICR) mass spectrometer.

25. The system of claim 22, further comprising a liquid chromatography column associated with the analyzer, the liquid chromatography column being configured to receive the ablated material prior to delivery to the analyzer.

26. A method of imaging and ablating a sample to enable analysis of an ablated portion of the sample, the method comprising:
providing an imaging and ablating device as in claim 1 and an analyzer configured to receive and analyze at least a portion of the ablated material received by the receiver;
acquiring an image of the sample;
selecting a region of interest within the sample;
delivering laser light from the ablation laser to the region of interest to ablate at least a portion of the region of interest;
capturing at least a portion of the ablated material on the receiver;
optionally passing at least a portion of the ablated material from the receiver to the analyzer; and
dynamically adjusting one or more parameters of the ablation laser or a position of the objective or a position of the receiver based on at least one detection signal from the laser focus detection unit, or a combination thereof.

27. The method of claim 26, wherein multiple laser pulses are applied to the sample from the ablation laser and wherein one or more of laser pulse frequency, laser pulse energy level, or laser pulse depth are dynamically varied across the multiple laser pulses.

28. The method of claim 26, wherein a spatial resolution value is utilized to acquire the image of the sample, and wherein the laser light is focused at a depth, measured from an upper surface of the sample, that is no more than R times the spatial resolution value, wherein R is a value of about 5 to about 30.

* * * * *